United States Patent
Holler et al.

(10) Patent No.: US 9,858,069 B2
(45) Date of Patent: Jan. 2, 2018

(54) TRANSITIONING BETWEEN ITERATIONS IN AGILE SOFTWARE DEVELOPMENT

(71) Applicant: VERSIONONE, INC., Alpharetta, GA (US)

(72) Inventors: Robert Holler, Cumming, GA (US); Ian Culling, Cumming, GA (US); Rajiv Delwadia, Woodstock, GA (US); Pavel Mamut, Buford, GA (US); Mark Crowe, Kula, HI (US); Donald Hanson, Cumming, GA (US); Patrick Boudreaux, Cumming, GA (US); Dan Gilkerson, San Diego, CA (US); Julie Brooks, Washington, DC (US); Eric Farr, Alpharetta, GA (US); Jerry Odenwelder, Atlanta, GA (US)

(73) Assignee: VERSIONONE, INC., Alpharetta, GA (US)

( * ) Notice: Subject to any disclaimer, the term of this patent is extended or adjusted under 35 U.S.C. 154(b) by 0 days.

(21) Appl. No.: 14/848,271

(22) Filed: Sep. 8, 2015

(65) Prior Publication Data
US 2016/0231999 A1    Aug. 11, 2016

Related U.S. Application Data

(63) Continuation of application No. 14/054,733, filed on Oct. 15, 2013, now Pat. No. 9,129,240, which is a (Continued)

(51) Int. Cl.
*G06F 9/44* (2006.01)
*G06Q 10/06* (2012.01)
*G06F 3/0484* (2013.01)

(52) U.S. Cl.
CPC ............ *G06F 8/70* (2013.01); *G06F 3/04842* (2013.01); *G06F 8/30* (2013.01); *G06F 9/44* (2013.01); *G06Q 10/06* (2013.01)

(58) Field of Classification Search
None
See application file for complete search history.

(56) References Cited

U.S. PATENT DOCUMENTS

| 5,544,300 A | 8/1996 | Skarbo et al. |
| 5,714,971 A | 2/1998 | Shalit et al. |

(Continued)

OTHER PUBLICATIONS

Akerman, Using ontology to support development of software architectures, 2006, 13 pgs.

(Continued)

*Primary Examiner* — Chuck Kendall
(74) *Attorney, Agent, or Firm* — Morgan, Lewis & Bockius LLP

(57) ABSTRACT

A computer-implemented method of managing work items associated with agile software development includes displaying a first group of incomplete work items associated with a current iteration of an agile software development project. In response to a first user input, a first incomplete work item of the first group is transferred from the current iteration to a subsequent iteration of the agile software development project. A determination is made that no incomplete work items remain associated with the current iteration. The current iteration is closed and the subsequent iteration is activated.

20 Claims, 18 Drawing Sheets

Related U.S. Application Data continuation of application No. 12/247,939, filed on Oct. 8, 2008, now Pat. No. 8,561,012.

(56) References Cited

U.S. PATENT DOCUMENTS

| | | | |
|---|---|---|---|
| 5,874,958 A | 2/1999 | Ludolph | |
| 5,943,053 A | 8/1999 | Ludolph et al. | |
| 5,956,030 A | 9/1999 | Conrad et al. | |
| 6,175,364 B1 | 1/2001 | Wong et al. | |
| 6,211,874 B1 | 4/2001 | Himmel et al. | |
| 6,239,798 B1 | 5/2001 | Ludolph et al. | |
| 6,694,009 B1 | 2/2004 | Anderson et al. | |
| 6,698,013 B1 | 2/2004 | Bertero et al. | |
| 6,850,255 B2 | 2/2005 | Muschetto | |
| 7,051,038 B1 | 5/2006 | Yeh et al. | |
| 7,117,447 B2 | 10/2006 | Cobb et al. | |
| 7,210,093 B1 | 4/2007 | Dutta | |
| 7,236,966 B1 | 6/2007 | Jackson et al. | |
| 7,272,815 B1 | 9/2007 | Eldridge et al. | |
| 7,376,891 B2 | 5/2008 | Hitchock et al. | |
| 7,415,677 B2 | 8/2008 | Arend et al. | |
| 7,421,648 B1 | 9/2008 | Davis | |
| 7,478,338 B2 | 1/2009 | Yanchar et al. | |
| 7,490,314 B2 | 2/2009 | Yuknewicz et al. | |
| 7,640,496 B1 | 12/2009 | Chaulk et al. | |
| 7,644,390 B2 | 1/2010 | Khodabandehloo et al. | |
| 7,899,694 B1 | 3/2011 | Marshall et al. | |
| 7,930,201 B1 | 4/2011 | Issa et al. | |
| 8,042,063 B1 | 10/2011 | Lin-Hendel | |
| 8,370,803 B1 | 2/2013 | Holler et al. | |
| 8,561,012 B1 * | 10/2013 | Holler | G06F 9/44 717/102 |
| 8,751,491 B2 | 6/2014 | Fitzmaurice et al. | |
| 8,863,107 B2 | 10/2014 | Krivopaltsev | |
| 9,129,240 B2 * | 9/2015 | Holler | G06F 9/44 |
| 2002/0062367 A1 | 5/2002 | Debber et al. | |
| 2002/0089526 A1 | 7/2002 | Buxton et al. | |
| 2002/0091732 A1 | 7/2002 | Pedro | |
| 2002/0138636 A1 | 9/2002 | Buttner et al. | |
| 2003/0033589 A1 | 2/2003 | Reyna et al. | |
| 2003/0046282 A1 | 3/2003 | Carlson et al. | |
| 2003/0061330 A1 | 3/2003 | Frisco et al. | |
| 2003/0103079 A1 | 6/2003 | Adatia et al. | |
| 2003/0158845 A1 | 8/2003 | Braley | |
| 2003/0160815 A1 | 8/2003 | Muschetto | |
| 2003/0163404 A1 | 8/2003 | Hu et al. | |
| 2003/0172020 A1 | 9/2003 | Davies et al. | |
| 2003/0182470 A1 | 9/2003 | Carlson et al. | |
| 2003/0182652 A1 | 9/2003 | Custodio | |
| 2003/0188290 A1 | 10/2003 | Corral | |
| 2003/0204644 A1 | 10/2003 | Vincent | |
| 2004/0081951 A1 | 4/2004 | Vigue et al. | |
| 2004/0186762 A1 | 9/2004 | Beaven et al. | |
| 2004/0243457 A1 | 12/2004 | D'Andrea et al. | |
| 2004/0243968 A1 | 12/2004 | Hecksel | |
| 2004/0268246 A1 | 12/2004 | Leban et al. | |
| 2005/0004825 A1 | 1/2005 | Ehrler et al. | |
| 2005/0065951 A1 | 3/2005 | Liston et al. | |
| 2005/0086239 A1 | 4/2005 | Swann et al. | |
| 2005/0086638 A1 | 4/2005 | Farn | |
| 2005/0114829 A1 | 5/2005 | Robin et al. | |
| 2005/0114830 A1 | 5/2005 | Knutson et al. | |
| 2005/0125771 A1 | 6/2005 | Vitanov et al. | |
| 2005/0132048 A1 | 6/2005 | Kogan et al. | |
| 2005/0198615 A1 | 9/2005 | Choi et al. | |
| 2005/0216879 A1 | 9/2005 | Ruhe | |
| 2005/0229157 A1 | 10/2005 | Johnson | |
| 2006/0036973 A1 | 2/2006 | Ogami et al. | |
| 2006/0069604 A1 | 3/2006 | Leukart et al. | |
| 2006/0123389 A1 | 6/2006 | Kolawa et al. | |
| 2006/0212327 A1 | 9/2006 | Norman | |
| 2006/0212857 A1 | 9/2006 | Neumann et al. | |
| 2006/0235771 A1 | 10/2006 | Oberoi | |
| 2006/0236261 A1 | 10/2006 | Forstall et al. | |
| 2006/0236301 A1 | 10/2006 | Minium et al. | |
| 2007/0033567 A1 | 2/2007 | Carlson et al. | |
| 2007/0094609 A1 | 4/2007 | Gilboa et al. | |
| 2007/0124682 A1 | 5/2007 | Fukeda et al. | |
| 2007/0168918 A1 | 7/2007 | Metherall et al. | |
| 2007/0288292 A1 | 12/2007 | Gauger | |
| 2008/0077416 A1 | 3/2008 | Hetrick | |
| 2008/0077530 A1 | 3/2008 | Banas et al. | |
| 2008/0097734 A1 | 4/2008 | Raffo | |
| 2008/0154749 A1 | 6/2008 | D'hooghe et al. | |
| 2008/0172625 A1 | 7/2008 | Montgomery | |
| 2008/0282228 A1 | 11/2008 | Subramanyam | |
| 2008/0301296 A1 | 12/2008 | York | |
| 2009/0024647 A1 | 1/2009 | Hein | |
| 2009/0204465 A1 | 8/2009 | Pradhan | |
| 2009/0271760 A1 | 10/2009 | Ellinger | |
| 2009/0300580 A1 | 12/2009 | Heyhoe et al. | |
| 2010/0088664 A1 | 4/2010 | Khodabandehloo et al. | |
| 2010/0218092 A1 | 8/2010 | Xiang et al. | |
| 2010/0306730 A9 | 12/2010 | Carlson et al. | |
| 2015/0089448 A1 | 3/2015 | King et al. | |

OTHER PUBLICATIONS

Almand, Office Action, U.S. Appl. No. 14/220,096, dated Nov. 3, 2014, 9 pgs.
Almand, Final Office Action, U.S. Appl. No. 14/220,096, dated Jun. 7, 2016, 9 pgs.
Ayewah, Evaluating Status Analysis Defect Warnings on Production Software, 2007, 7 pgs.
Barton, Reporting scrum project progress to executive management through metrics, Jan. 2005, 9 pgs.
Boehm, A View of 20th and 21st Century Software Engineering, 2006, 18 pgs.
Cause, Delivering real business value using FDD, Winter 2004, 13 pgs.
Ceschi, Project management in plan-based and agile companies, 2005, 7 pgs.
Chou, Redesigning a large and complex website: how to begin and a method for success, ACM, Providence, RI, Nov. 20-23, 2002, pp. 22-28.
Cruise control, cruisecontrol.sourceforce.net, Apr. 9, 2010, 1 pg.
Cruise control, cruisecontrol.sourceforge.net, Apr. 9, 2010, 34 pgs.
Danube Technologies, ScrumWorks pro web client user guide, Feb. 2007, 7 pgs.
Danube Technologies, ScrumWorks quick start guide, v.1.4.2, Jan. 2006, 10 pgs.
Danube Technologies, ScrumWorks web client user guide, v.1.4.2., Jan. 2006, 6 pgs.
DeLuca, FDD implementations, Nov. 2005, 10 pgs.
DeLuca, Parking lot chart—aesthetics, Mar. 16, 2007, 2 pgs.
DeLuca, Parking lot chart example 1, Dec. 17, 2003, 2 pgs.
DeLuca, Parking lot chart example 2, Nov. 20, 2003, 1 pg.
DeLuca, Parking lot chart—legend, Mar. 16, 2007, 2 pgs.
Derby, Agile retrospectives, The Pragmatic Bookshelf, 2006, 186 pgs.
Fowler, The new methodology, Dec. 13, 2005, 19 pgs.
Holler, Final Office Action, U.S. Appl. No. 12/101,089, dated Mar. 12, 2014, 16 pgs.
Holler, Notice of Allowance, U.S. Appl. No. 12/016,191, dated Jan. 15, 2014, 7 pgs.
Holler, Notice of Allowance, U.S. Appl. No. 12/016,192, dated Sep. 28, 2012, 8 pgs.
Holler, Notice of Allowance, U.S. Appl. No. 12/245,566, dated Nov. 26, 2013, 11 pgs.
Holler, Notice of Allowance, U.S. Appl. No. 12/247,963, dated Jan. 30, 2013, 8 pgs.
Holler, Notice of Allowance, U.S. Appl. No. 13/858,819, dated Apr. 3, 2014, 8 pgs.
Holler, Notice of Allowance, U.S. Appl. No. 12/357,225, dated Jun. 20, 2014, 12 pgs.
Holler, Office Action, U.S. Appl. No. 12/016,191, dated Nov. 12, 2010, 10 pgs.
Holler, Office Action, U.S. Appl. No. 12/016,191, dated Dec. 16, 2011, 13 pgs.

(56) References Cited

OTHER PUBLICATIONS

Holler, Office Action, U.S. Appl. No. 12/016,191, dated Jul. 19, 2012, 12 pgs.
Holler, Office Action, U.S. Appl. No. 12/016,191, dated Jun. 19, 2013, 13 pgs.
Holler, Office Action, U.S. Appl. No. 12/016,191, dated May 27, 2011, 16 pgs.
Holler, Office Action, U.S. Appl. No. 12/016,192, dated Nov. 18, 2011, 10 pgs.
Holler, Office Action, U.S. Appl. No. 12/016,192, dated Apr. 26, 2011, 11 pgs.
Holler, Office Action, U.S. Appl. No. 12/016,192, dated Apr. 30, 2012, 12 pgs.
Holler, Office Action, U.S. Appl. No. 12/016,193, dated Jul. 9, 2012, 10 pgs.
Holler, Office Action, U.S. Appl. No. 12/016,193, dated Jan. 30, 2013, 13 pgs.
Holler, Office Action, U.S. Appl. No. 12/101,084, dated Feb. 18, 2011, 14 pgs.
Holler, Office Action, U.S. Appl. No. 12/101,084, dated Jun. 21, 2013, 14 pgs.
Holler, Office Action, U.S. Appl. No. 12/101,084, dated Aug. 26, 2011, 17 pgs.
Holler, Office Action, U.S. Appl. No. 12/101,089, dated Jan. 9, 2012, 11 pgs.
Holler, Office Action, U.S. Appl. No. 12/101,089, dated Jun. 20, 2013, 13 pgs.
Holler, Office Action, U.S. Appl. No. 12/101,089, dated May 23, 2012, 16 pgs.
Holler, Office Action, U.S. Appl. No. 12/101,089, dated Nov. 20, 2014, 16 pgs.
Holler, Office Action, U.S. Appl. No. 12/174,511, dated Jan. 4, 2013, 23 pgs.
Holler, Office Action, U.S. Appl. No. 12/174,511, dated Nov. 10, 2011, 18 pgs.
Holler, Office Action, U.S. Appl. No. 12/174,511, dated May 11, 2012, 21 pgs.
Holler, Office Action, U.S. Appl. No. 12/245,566, dated May 14, 2012, 15 pgs.
Holler, Office Action, U.S. Appl. No. 12/245,566, dated Apr. 24, 2013, 17 pgs.
Holler, Office Action, U.S. Appl. No. 12/245,566, dated Nov. 30, 2012, 16 pgs.
Holler, Office Action, U.S. Appl. No. 12/247,939, dated Jun. 7, 2012, 9 pgs.
Holler, Office Action, U.S. Appl. No. 12/247,939, dated Nov. 19, 2012, 9 pgs.
Holler, Office Action, U.S. Appl. No. 12/247,939, dated Apr. 26, 2013, 5 pgs.
Holler, Office Action, U.S. Appl. No. 12/247,963, dated Jul. 9, 2012, 23 pgs.
Holler, Office Action, U.S. Appl. No. 12/247,963, dated Mar. 15, 2012, 20 pgs.
Holler, Office Action, U.S. Appl. No. 12/247,963, dated Jun. 30, 2011, 18 pgs.
Holler, Office Action, U.S. Appl. No. 12/357,225, dated Oct. 3, 2013, 29 pgs.
Holler, Office Action, U.S. Appl. No. 12/357,225, dated Jul. 19, 2012, 28 pgs.
Holler, Office Action, U.S. Appl. No. 12/357,225, dated Nov. 23, 2012, 30 pgs.
Holler, Office Action, U.S. Appl. No. 13/858,819, dated Nov. 18, 2013, 10 pgs.
Holler, Office Action, U.S. Appl. No. 14/054,733, dated Oct. 24, 2014, 11 pgs.
Holler, Notice of Allowance, U.S. Appl. No. 14/054,733, dated Apr. 13, 2015, 10 pgs.
Holler, Office Action, U.S. Appl. No. 13/890,179, dated Jun. 22, 2013, 12 pgs.
Holler, Final Office Action, U.S. Appl. No. 13/890,179, dated Jan. 21, 2016, 11 pgs.
Holler, Office Action, U.S. Appl. No. 14/246,019, dated Jul. 20, 2015, 30 pgs.
Holler, Notice of Allowance, U.S. Appl. No. 14/246,019, dated Nov. 16, 2015, 8 pgs.
Holler, Office Action, U.S. Appl. No. 14/288,317, dated Dec. 16, 2015, 8 pgs.
IBM / Cognos Software, Budgeting and forecasting software, Jun. 2, 2009, 3 pgs.
Jansen, "On the Influence of Test-Driven Development on Software Design," Proceedings of the 19th Conference on Software Engineering Education & Training (CSEET'06) 2006 IEEE, <http://ieeexplore.ieee.org/stamp/stamp.js?tp=&arnumber=1617340>, 8 pgs.
JetBrains, Distributed build management and continuous integration server, Apr. 9, 2010, 2 pgs.
JetBrains, Distributed build management and continuous integration server: features, Apr. 9, 2010, 2 pgs.
JetBrains, TeamCity 3.0-overview, Jun. 28, 2010, 8 pgs.
JetBrains, TeamCity 4.5, 2003-2009, 2 pgs.
Kane, David, "Introducing Agile Development into Bioinformatics An Experience Report," 2003 IEEE, 1 pg., <http://ieee.org/stamp.jsp?tp+&arnumber+123146.>.
Kolcz, Using SPEM/UML Profile to Specification of IS Development Processes, Oct. 2006, 68 pgs.
Li, Empirical Evaluation of Defect Projection Models for Widely-deployed Production Software Systems, 2004, 10 pgs.
Lyu, Software Reliability Engineering: A Roadmap, 2007, 18 pgs.
Memmel, T., et al., Agile Methods and Visual Specification in Software Development A Chance to Ensure Universal Access, 2007 springer, pp. 454-462, downloaded from <http://link.springer.com/chapter/10.1007/978-3-540-73279-2_51>.
Microsoft Office Online, Demo: Base sales forecasts and trendlines on data, Jun. 2, 2009, 3 pgs.
Microsoft Office Online, Demo: Check that hunch with Excel what-if scenarios, Jun. 2, 2009, 1 pg.
Microsoft Office Online, Show trends and forecast sales with charts, Jun. 2, 2009 7 pgs.
Microsoft Office Online, Understanding scheduling in Microsoft Project 2002, 7 pgs.
Mountain Goat Software, Training for Scrum task board use, 1998-2010, 5 pgs.
Netsuite, Standard & advanced sales forecasting software, (no date available) 6 pgs.
Odenwelder, Notice of Allowance, U.S. Appl. No. 12/463,299, dated Dec. 4, 2012, 13 pgs.
Odenwelder, Office Action, U.S. Appl. No. 12/463,299, dated Apr. 25, 2012, 18 pgs.
Ouimet, SERT: Software Tool for Generating Student Engagement Reports, IEEE, ITNG'07, 2007, 8 pgs.
Phan et al., Progressive Multiples for Communication-Minded Visualization, ACM, Montreal, Canada, May 28-30, 2007, pp. 225-232.
Ribarsky et al., Glyphmaker: Creating Customized Visualizations of Complex Data, IEEE, Jul. 1994, pp. 57-64.
Robbins, Adopting Open Source Software Engineering Practices by Adopting OSSE Tools, 2005, 16 pgs.
Sandler, Source control in ten minutes: a subversion tutorial, Jan. 24, 2006, 6 pgs.
Scacchi, Walt, Modeling Simulating and Enacting Complex Orgnizational Processes A Life Cycle Approachl, 1996 MIT, 21 pgs., <http//citeseerx.ist.psu.edu/viewdoc/download?doi=10.1.1.48.8110&rep=rep1&type=pdf>.
Screenshot of Xplanner Date, Apr. 8, 2010, 1 pg.
Shih et al., Using URLs and Table Layout for Web Classification Tasks, ACM, New York, NY, May 17-22, 2004, pp. 193-202.
Sneed, Reengineering Reports, IEEE, WRCE'04, 2004, 10 pgs.
Sugarcrm, Sugarsuite screenshot, Apr. 8, 2010, 1 pg.
Trask, Bruce, "Using Model-Driven Engineering to Complement Software Product Line Enginering in Developing Software Defined

(56) References Cited

OTHER PUBLICATIONS

Radion Components and Applications," OOPSLA'06, Oct. 22-26, Portland, Oregon, <http://dl.acm.org/citation.cfm?id=1176733>, 8 pgs.

Vanguard Software, Forecasting software, Jun. 2, 2009, 4 pgs.

VersionOne, Exhibits A&B, May 31, 2007 Figures 1&2, 2 pgs.

VersionOne, Frequently asked questions, 2005, 4 pgs.

VersionOne, Simplify the rollout of agile development within your organization, 2007, 2 pgs.

VersionOne, Simplifying software delivery, 2006, 1 pg.

Xie, Qing, Developing cost-effective Model-Based Techniques for GUI Testing, 2006 ACM, pp. 997-1000, <http://dl.acm.org/citation.cfm?id+1134473>.

Xplanner how to notes, May 10, 2005, 9 pgs.

Yu, A Versatile Development Process for Small to Large Projects Using IBM CMVC, 1994, 9 pgs.

Holler, Notice of Allowance, U.S. Appl. No. 12/101,089, dated Jul. 11, 2016, 13 pgs.

Holler, Notice of Allowance, U.S. Appl. No. 13/890,179, dated Jul. 6, 2016, 14 pgs.

Holler, Final Office Action, U.S. Appl. No. 14/288,317, dated Jul. 29, 2016, 8 pgs.

Holler, Notice of Allowance, U.S. Appl. No. 14/288,317, dated Feb. 21, 2017, 7 pgs.

Holler, Office Action, U.S. Appl. No. 14/463,385, dated Mar. 28, 2017, 12 pgs.

\* cited by examiner

File | Plan Backlog Item | View | Go | Bookmarks | Tools | Help    http://www.secure.v1host.com/

Backlog Item Planner

Backlog Item

Main

|              |                    |
|--------------|--------------------|
| ID:          | B-01019            |
| Title:       | Enter RMA          |
| Project:     | Team A             |
| Iteration:   | Month C 1st Half   } 272
| Feature Group: | Administration   |
| Description: |                    |
| Estimate:    | 2.00               |

273 →
Tasks and Tests                                    Add Task 275 | Add Test 276 | Customize | Export (xls)
                                                                                                       Detail Estimate 268

| Title 212 | ID 214 | Owner 216 | | |
|---|---|---|---|---|
| 274 → Enter RMA Using Order Number | AT-01034 | BT | 4.00 | 277 → Edit \| More |
| Enter RMA Without Order Number | AT-01068 | BT | 4.00 | Edit \| More |
| Build | TK-01070 | AS | 8.00 | Edit \| More |
| Code Review | TK-01072 | TC,DD | 4.00 | Edit \| More |

[Rotated screenshot of a Defect window]

File | Plan Backlog Item | View | Go | Bookmarks | Tools | Help     http://www.secure.v1host.com/

Defect

Main

- 214 → ID: B-01019
- 212 → Title: Inventory Levels Off in Warehouse 265    } 2042
- 269 → Total To Do: 3.00
- 218 → Status: Future    2052
- 2044 → Resolution:     2054

NOTE
All Tasks and Tests will be closed, and all To Do values will be cleared.
↙ 2046

[Close Defect 2048]    [Cancel 2050]

2040

File | Plan Backlog Item | View | Go | Bookmarks | Tools | Help    http://www.secure.v1host.com/

Add Shipping Notes 2020

-Original Backlog Item 2104

☐ Title 212

| | Iteration 2106 | Estimate 222 | To Do 269 |
|---|---|---|---|
| ☐ ⊕ Add Shipping Notes 2020 | Month C 1st Half | 52.00 | 10.00 |
| ⎧ Design Layout 2110 | Month C 1st Half | 8.00 | 0.00 |
| ⎪ Build UI 2112 | Month C 1st Half | 8.00 | 3.00 |
| 2108 ⎨ Service Changes 2114 | Month C 1st Half | 24.00 | 1.00 |
| ⎪ Update Documentation 2116 | Month C 1st Half | 4.00 | 2.00 |
| ⎪ Test Criterion 1 2118 | Month C 1st Half | 4.00 | 0.00 |
| ⎩ Test Criterion 2 2120 | Month C 1st Half | 4.00 | 4.00 |

-New Backlog Item 2122

☐ Title 212

| Iteration 2106 | Estimate 222 | To Do 269 |
|---|---|---|
| | No Results to Display 2124 | |

Split 2102

OK 2126    Cancel 2128

Figure 2I

Add Shipping Notes 2020

-Original Backlog Item 2104

☐ Title 212
☐ ⊕ Add Shipping Notes 2020

2130 { Design Layout 2110
      Test Criterion 1 2118

| Iteration 2106 | Estimate 222 | To Do 269 |
|---|---|---|
| Month C 1st Half | 0.00 | 0.00 |
| Month C 1st Half | 8.00 | 0.00 |
| Month C 1st Half | 4.00 | 0.00 |

-New Backlog Item 2122

☐ Title 212
☐ ⊕ Add Shipping Notes 2020

Build UI 2112
       Service Changes 2114
2132 { Update Documentation 2116
       Test Criterion 2 2120

| Iteration 2106 | Estimate 222 | To Do 269 |
|---|---|---|
| Month C, 2nd Half | 40.00 | 10.00 |
| Month C, 2nd Half | 8.00 | 3.00 |
| Month C, 2nd Half | 24.00 | 1.00 |
| Month C, 2nd Half | 4.00 | 2.00 |
| Month C, 2nd Half | 4.00 | 4.00 |

Split 2102

OK 2126    Cancel 2128

Figure 2J

TRANSITIONING BETWEEN ITERATIONS IN AGILE SOFTWARE DEVELOPMENT

PRIORITY CLAIM

This application is a continuation of U.S. patent application Ser. No. 14/054,733, filed Oct. 15, 2013, which claims priority to and is a continuation of U.S. patent application Ser. No. 12/247,939, filed Oct. 8, 2008, now U.S. Pat. No. 8,561,012, all of which are incorporated by reference herein in their entirety.

TECHNICAL FIELD

The disclosed embodiments relate generally to managing agile software development, and more particularly, to transitioning between iterations in agile software development.

BACKGROUND

Agile software development refers to software development methodologies in which software is developed incrementally in steps referred to as iterations. Iterations typically are measured in weeks and may vary in length from one week or less to one month or more.

Examples of agile software development methodologies include Scrum, Extreme Programming (XP), Crystal, Lean Development, AgileUP, and Dynamic Systems Development Method (DSDM). Agile software development methods also have been referred to as lightweight methods. Methodologies may have their own vocabulary. For example, an iteration may be referred to as a sprint or a timebox, depending on the methodology. Agile software development is distinguishable from the "waterfall" model of sequential software development.

Software for implementing agile development methodologies and for tracking and reporting on projects that use agile methodologies can help developers to realize fully the benefits, such as flexibility and rapid cycle times, offered by these methodologies. Accordingly, there is a need for robust agile development management software that is convenient to use.

SUMMARY

In some embodiments, a computer-implemented method of managing work items associated with agile software development includes displaying a first group of incomplete work items associated with a current iteration of an agile software development project. In response to a first user input, a first incomplete work item of the first group is transferred from the current iteration to a subsequent iteration of the agile software development project. A determination is made that no incomplete work items remain associated with the current iteration. The current iteration is closed and the subsequent iteration is activated.

In some embodiments, a system for managing work items associated with agile software development includes memory, a display, one or more processors, and one or more programs stored in the memory and configured for execution by the one or more processors. The one or more programs include instructions to display a first group of incomplete work items associated with a current iteration of an agile software development project; instructions to transfer, in response to a first user input, a first incomplete work item of the first group from the current iteration to a subsequent iteration of the agile software development project; instruc-tions to determine that no incomplete work items remain associated with the current iteration; instructions to close the current iteration; and instructions to activate the subsequent iteration.

In some embodiments, a computer readable storage medium stores one or more programs configured to be executed by a computer system to manage work items associated with agile software development. The one or more programs include instructions to display a first group of incomplete work items associated with a current iteration of an agile software development project; instructions to transfer, in response to a first user input, a first incomplete work item of the first group from the current iteration to a subsequent iteration of the agile software development project; instructions to determine that no incomplete work items remain associated with the current iteration; instructions to close the current iteration; and instructions to activate the subsequent iteration.

BRIEF DESCRIPTION OF THE DRAWINGS

FIGS. 2C and 2D are schematic screenshots of a user interface for viewing an asset's attributes and related assets in accordance with some embodiments.

FIG. 2G is a schematic screenshot of a user interface for closing a work item in accordance with some embodiments.

FIGS. 2I and 2J are schematic screenshots of a user interface for splitting a work item in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
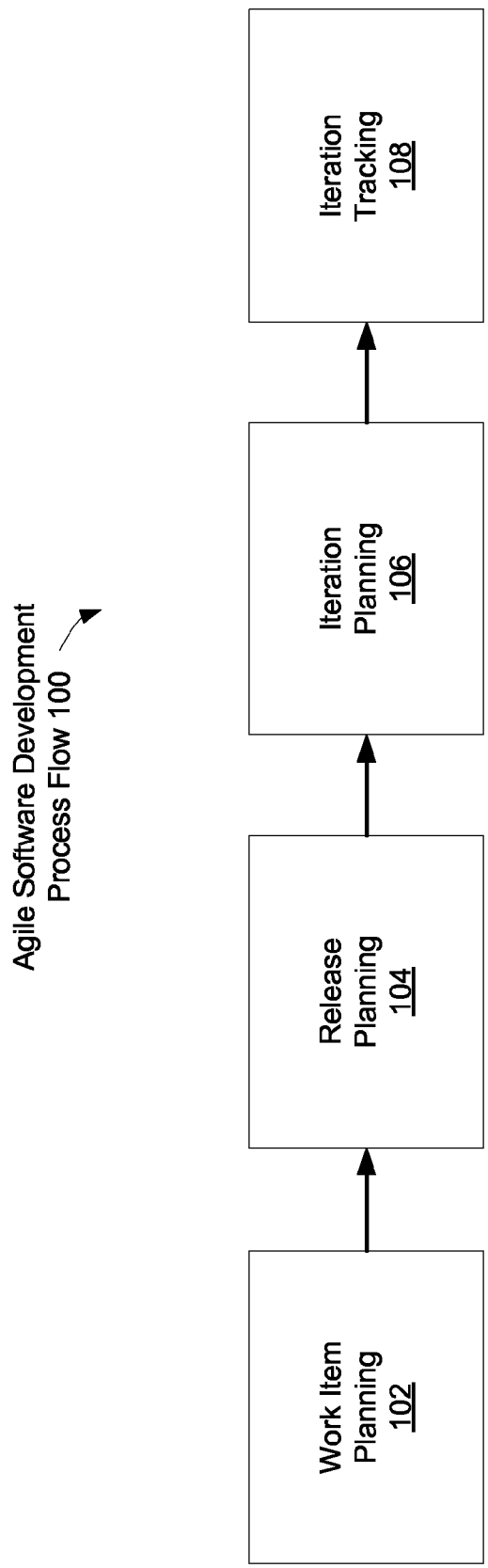
FIG. 1 is a flow diagram illustrating an agile software development process flow 100 in accordance with some embodiments.

FIG. 1 is a flow diagram illustrating an agile software development process flow 100 in accordance with some embodiments. Support for performing operations in the process flow 100 can be provided by agile development management software.

Work item planning (102) includes identifying work to be performed during the software development process. For example, features to be included in the software being developed are specified and software defects to be fixed during development are identified. Depending on the agile methodology being used, features also may be referred to as stories, backlog items, or requirements. In general, a work item is any item for which the agile development management software platform can track progress, such as time spent working on the item. Estimates for the time that work items require for completion (e.g., the time to complete features or to fix defects) may be entered during the work item planning process. Furthermore, groups of work items may be defined. For example, a feature group may be defined to include a plurality of features. Work estimates for the features within a feature group may be added together to provide an overall work estimate for the feature group. The work estimate for a group of work items (e.g., a feature group) thus may provide a roll-up of the work estimates for the individual work items (e.g., features) in the group.

Release planning (104) includes assigning identified work items (e.g., features and defects) to particular planned software releases. For example, certain features may be included in an initial release, with additional features to be added in subsequent releases. Similarly, fixing various defects may be scheduled across multiple releases. More generally, release planning may include assigning identified work items to levels or nodes in a project hierarchy. The project hierarchy may include projects, sub-projects, releases, teams and other internal organizations, clients or customers, and vendors.

Iteration planning (106) includes assigning work items to iterations. There may be multiple iterations performed to prepare a particular software release; iteration planning thus involves specifying what work will be performed in which iterations. For example, features and defects are assigned to particular iterations. Within each iteration, tasks and tests corresponding to the features and defects are defined. A task is a unit of work performed as part of delivering a feature. In some embodiments, a task is defined such that it takes no more than 3 days to perform. A test is an acceptance criterion that a feature must satisfy. Estimates for the time required to complete tests and tasks may be entered. In some embodiments, the estimates for tasks and tests are independent of the estimates for their features. Tasks and tests are examples of work items.

The actual time spent working on the work items (e.g., on the features and defects and their corresponding tasks and tests) during an iteration is tracked (108) and compared against the estimates. Progress and status reports may be displayed graphically. For example, a "dashboard" user interface may display multiple graphical reports. Possible graphical reports include burndown charts, velocity charts, burn-up charts, Gantt charts, parking lot reports, scope change, defect trending, test case status, and defect actuals. A burndown chart illustrates remaining work vs. time. Velocity refers to the estimated work per iteration on a project. Scope change refers to a change in requirements, such as the addition or deletion of features and defects. Reports may be generated for a specified level or node in the project hierarchy (e.g., for a specified project, sub-project, release, team or other internal organization, client or customer, and/or vendor.)

The operations in the development process flow 100 are presented sequentially in FIG. 1 for purposes of illustration. However, the operations need not be performed sequentially. For example, the planning operations 102, 104, and 106 may be updated dynamically throughout the agile development process. Similarly, tracking 108 may be performed dynamically, and may prompt subsequent planning changes. Furthermore, multiple operations may be combined into a single operation and additional operations may be added to the flow 100.

At a high level, the agile software development process has various assets associated with it. Nodes in the project hierarchy, such as projects, sub-projects, releases, teams, clients, and vendors, can be considered assets, as can iterations. Work items such as features and defects are assets, as are tasks and tests. In general, work items include any asset tracked by the agile development management software platform. Feature groups are assets. Assets may be associated with (i.e., related to) other assets. In some embodiments, for example, tasks and tests are associated with corresponding features and defects, which in turn may be associated with corresponding iterations. In another example, features in a particular feature group are associated with the feature group.

An asset includes various attributes. In some embodiments, each kind of asset (e.g., project, iteration, feature group, feature, task, etc.) has a specified set of associated, or related, attributes. Types of attributes include text strings, numerical values, values calculated according to a formula ("synthetic attributes"), and associated/related assets. A first asset associated with (i.e., related to) a second asset thus is considered an attribute of the second asset. An attribute may be automatically included (e.g., hard-coded or created for a particular installation) in agile development management software or may be customized (i.e., user-defined).

Attention is now directed to user interfaces for agile development management software. In some embodiments, user interfaces are shown in a browser window. In some embodiments, user interfaces are shown by a stand-alone application.

Agile development management software can display groups of assets of a particular type. For example, groups of assets associated with work item planning, release planning, or iteration planning may be displayed.

Figure 2A:
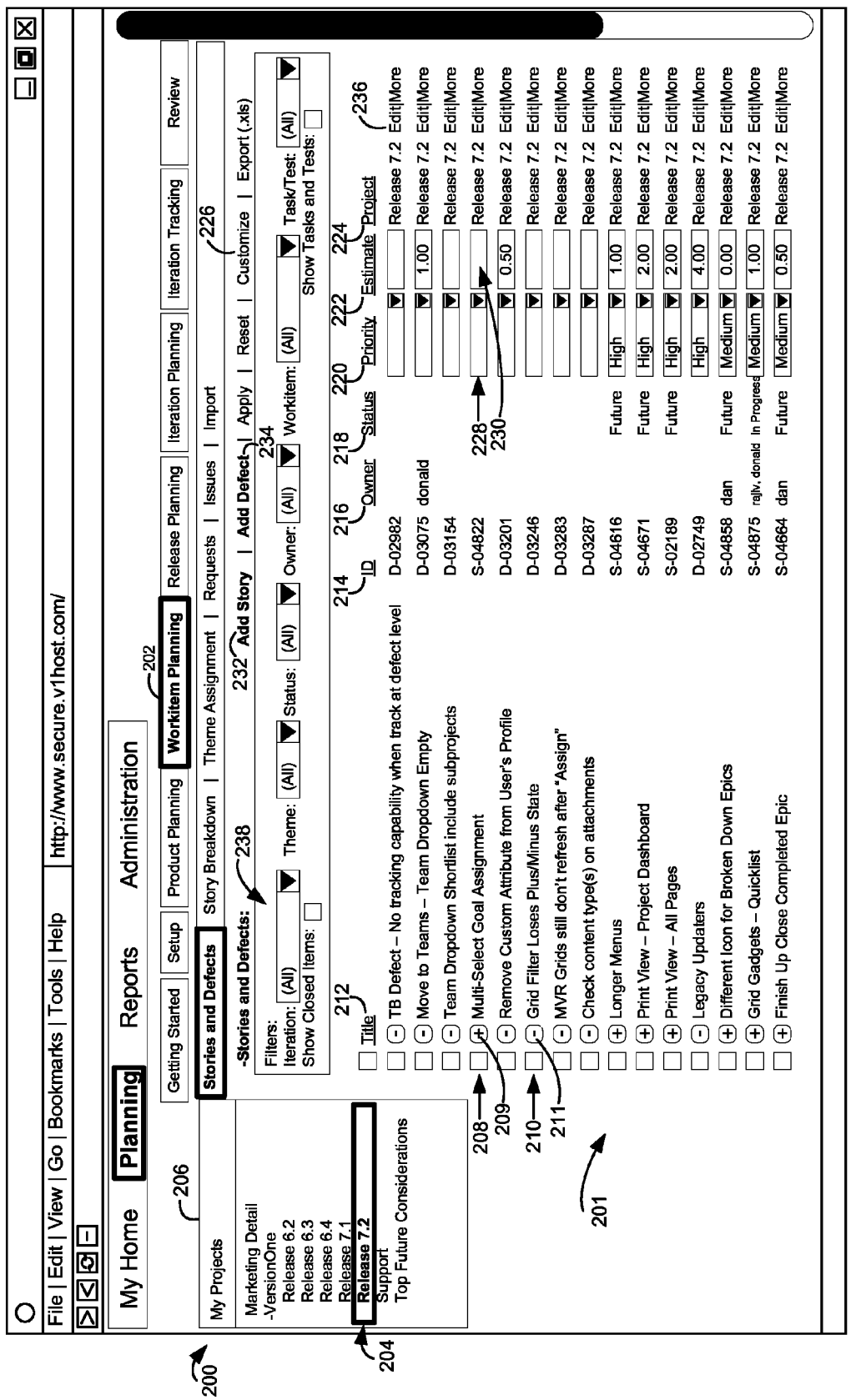
FIGS. 2A and 2B are schematic screenshots of a user interface displaying assets associated with an agile software development process in accordance with some embodiments.

FIG. 2A is a schematic screenshot of a user interface 200 displaying a group 201 of assets associated with an agile software development process, in accordance with some embodiments. In some embodiments, the particular type of group is determined by selecting a tab, selection box, radio button icon, or item in a drop-down menu. For example, in FIG. 2A a "workitem planning" tab 202 has been selected, indicating that the group 201 is a work item planning group. A group of a particular type may include multiple kinds of assets. For example, the work item planning group 201 includes features (e.g., "Multi-Select Goal Assignment" 208) and defects (e.g., "Grid Filter Loses Plus/Minus State" 210), as indicated by features icons 209 and defects icons 211.

The displayed assets in the group 201 are associated with a particular project hierarchy node 204, displayed for example in a project selection window 206.

Assets may be added to the group 201, for example, by selecting an "add story" (i.e., add feature) link 232 or an "add defect" link 234. In general, a user interface for displaying a group of assets may include multiple links or icons for adding multiple respective kinds of assets, or may include a single link or icon for adding assets. In some embodiments, selection of a link or icon for adding assets results in the display of a separate user interface for adding assets (not shown).

Assets displayed in the group 201 also may be edited, for example, by selecting an "edit" link (e.g., 236) corresponding to a respective asset. In some embodiments, selection of an edit link or corresponding icon results in the display of a separate user interface for editing assets.

The displayed assets include a set of attributes selected for display, such as title 212, ID 214, owner 216, status 218, priority 220, estimate 222, and project 224. Some of the attributes are also assets, such as project 224. Some of the values for the attributes are blank: for example, no owner 216, status 218, priority 220, or estimate 222 is shown for a number of assets, including feature 208.

Assets to be displayed in the group 201 may be filtered according to one or more attributes using filters 238.

A subset of the displayed attributes includes user input fields to accept edits to attribute values. For example, a user may select a priority from a drop-down box 228 and may enter a work or size estimate (e.g., an estimate of time) in a text input box 230.

Figure 2B:
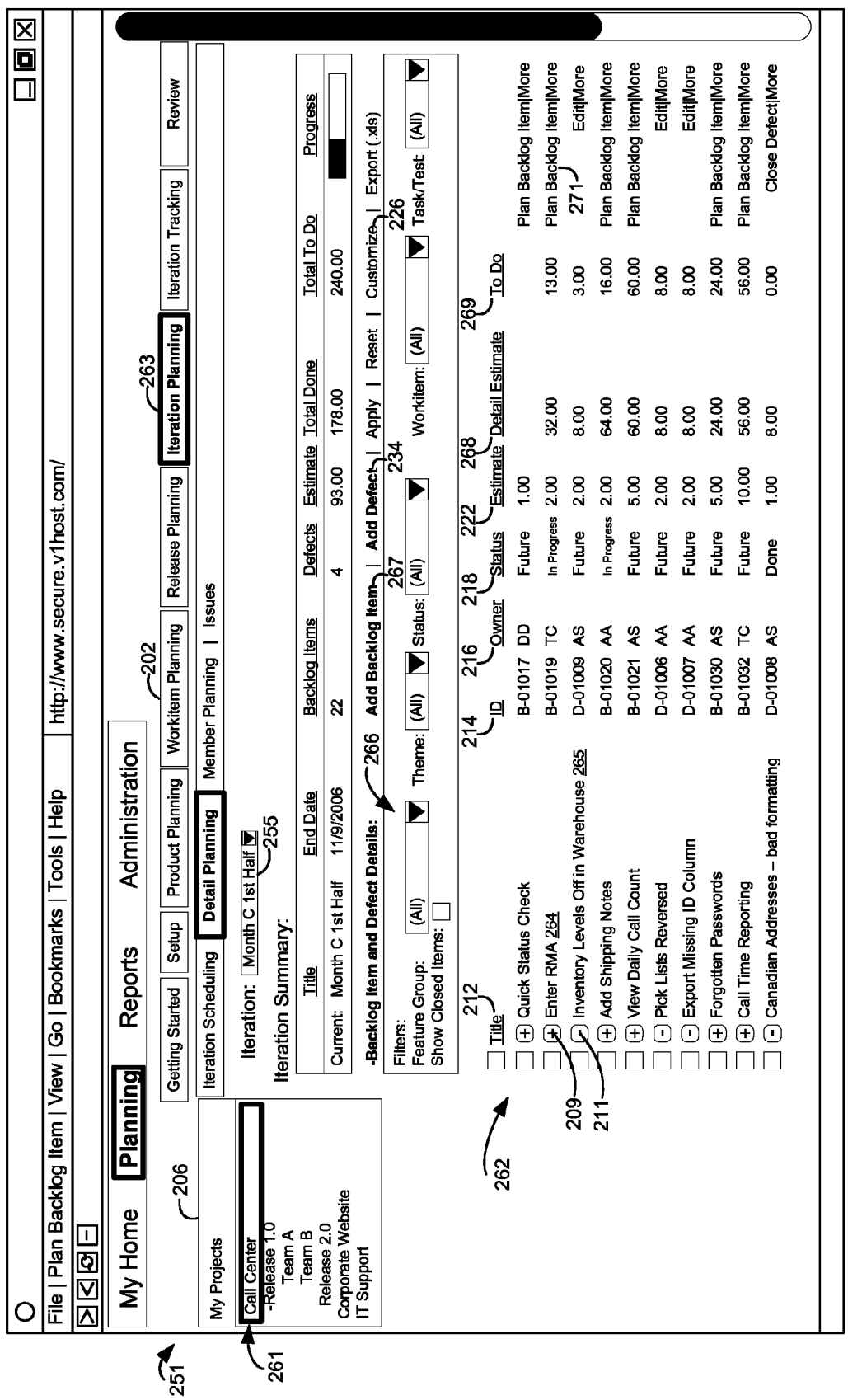

Attention is now directed to accessing and displaying user interfaces for viewing an asset's attributes and related assets. FIG. 2B, like FIG. 2A, is a schematic screenshot of a user interface displaying a group of assets associated with an agile software development process in accordance with some embodiments. Specifically, the user interface 251 of FIG. 2B displays a group 262 of assets associated with iteration planning, as indicated by selection of an "iteration planning" tab 263. The iteration planning group 262 includes features (e.g., "Enter RMA" 264) and defects (e.g., "Inventory Levels Off in Warehouse" 265), as indicated by features icons 209 and defects icons 211. The displayed assets in the group 262 are associated with a particular iteration 255. The displayed assets in the group 262 also are associated with a particular project hierarchy node 261 (also referred to as a project hierarchy level 261), displayed for example in the project selection window 206. The project hierarchy node 261 corresponds to a project entitled "Call Center," which includes multiple software releases (e.g., "Release 1.0" and "Release 2.0") and has multiple teams (e.g., "Team A" and "Team B") working on releases. Each release and each team may be selected as a project hierarchy node in the project selection window 206. In some embodiments, in response to selection of a particular project hierarchy node, the displayed group of assets is updated to display assets associated with the selected project hierarchy node. For example, in response to selection of a particular release or team, the displayed group 262 of assets is updated to display assets associated with iteration planning for the selected release or team.

Assets to be displayed in the group 262 may be filtered according to one or more attributes using filters 266. Assets may be added to the group 262 by, for example, selecting an "add backlog item" link 267 or an "add defect" link 234.

The displayed assets in the group 262 include a set of attributes, such as title 212, ID 214, owner 216, status 218, estimate 222, detail estimate 268, and "to do" 269. The "estimate" 222 and "detail estimate" 268 attributes provide estimates of quantities of work associated with assets, while the "to do" 269 attribute provides estimates of quantities of work remaining to be done for assets. As discussed with regard to FIG. 2A, some of the attributes may be assets associated with a displayed asset in the group 262 (i.e., may be related assets).

In some embodiments, an asset displayed in the group 262 may be edited by selecting a link corresponding to the asset, which results in display of a separate user interface (UI) for editing the asset. For example, selection of the "plan backlog item" link 271 for the "enter RMA" asset 264 results in display of a window 290 (FIG. 2C). The window 290 displays attributes 272 of the "enter RMA" asset 264, such as ID, title, project, iteration, feature group, description, and estimate. In some embodiments, the attributes are displayed in a list.

The window 290 also displays related assets 273 associated with the "enter RMA" asset 264. In this example, the related assets 273 include tasks and tests associated with the "enter RMA" asset 264, which is a feature. Attributes of the related assets 273 (e.g., title 212, ID 214, owner 216, and detail estimate 268) are displayed.

Figure 2D:
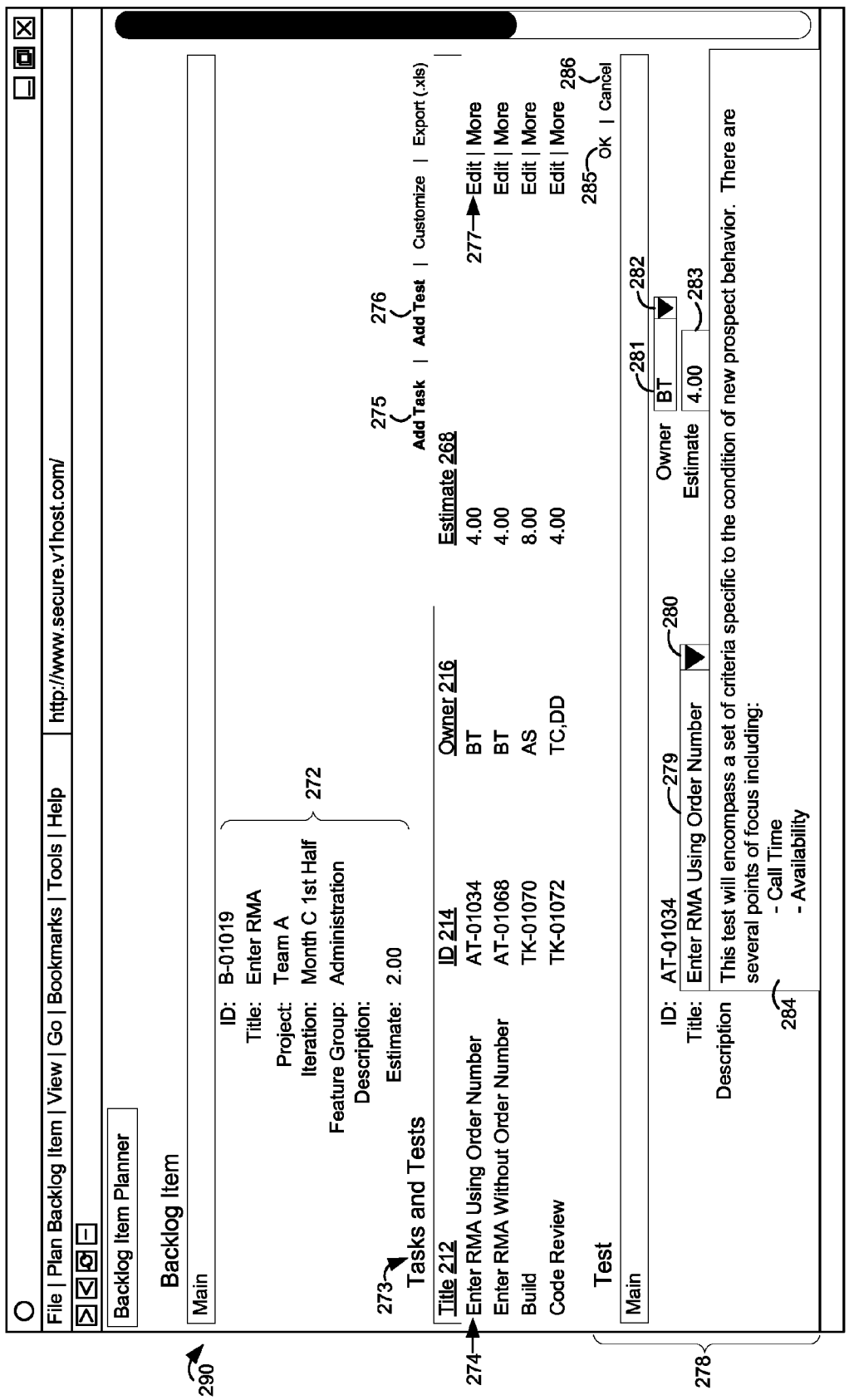

The related assets 273 may be edited by selecting a corresponding link. For example, related asset 274 ("Enter RMA Using Order Number") may be edited by selecting an "edit" link 277. In some embodiments, in response to selection of the "edit" link 277, a UI 278 (FIG. 2D) for editing the related asset 274 is displayed in the window 290 along with the attributes 272 and related assets 273. The UI 278 includes user input fields (e.g., 279, 281, 283, and 284) to display and receive edits to attributes of the related asset 274. In some embodiments, the UI 278 includes drop-down menus (e.g., 280, 282) to select values for attributes of the related asset 274. In some embodiments, the user may enter values directly into the user input fields. Edits may be applied by selecting the "OK" link 285 or canceled by selecting the "cancel" link 286. In some embodiments, upon selection of the "OK" link 285, display of the UI 278 is ceased and displayed attribute values for the edited related asset 274 are updated in response to the edits. The user then may select another edit link associated with another related asset, resulting in display of another UI 278 within the window 290 for displaying and editing the newly selected related asset. In some embodiments, multiple UI's for displaying and editing multiple respective related assets may be open simultaneously within the window 290 and may be accessed simply by scrolling within the window 290.

In some embodiments, a new related asset may be added via the window 290. For example, a new task or test for the "enter RMA" asset 264 may be added by selecting the "add task" link 275 or "add test" link 276. In some embodiments, selection of the "add task" link 275 or "add test" link 276 results in display, within the window 290, of a user interface analogous to UI 278 for which the user input fields (e.g., 279, 281, 283, and 284) are blank. The user may enter attribute values for the new task or test through the user input fields. In some embodiments, the user may specify attribute values via drop-down menus (e.g., 280, 282). In some embodiments, creation of the new task or test is completed by selecting the "OK" icon 285 or canceled by selecting the "cancel" icon 286. In some embodiments, upon selection of the "OK" icon 285, display of the UI for creating the new related asset is ceased and the new related asset is displayed among the related assets 273.

The window 290 thus provides a single integrated interface through which a user may view multiple levels of information for an asset in addition to performing edits. For example, the user may view attributes of the asset itself and of related assets, and may edit or create related assets. The integrated interface allows the user to perform these tasks without having to browse through a succession of windows.

Agile development management software can provide user interfaces for transitioning between iterations by closing a current iteration and activating a subsequent iteration, as illustrated in FIGS. 2E-2L in accordance with some embodiments.

Figure 2E:
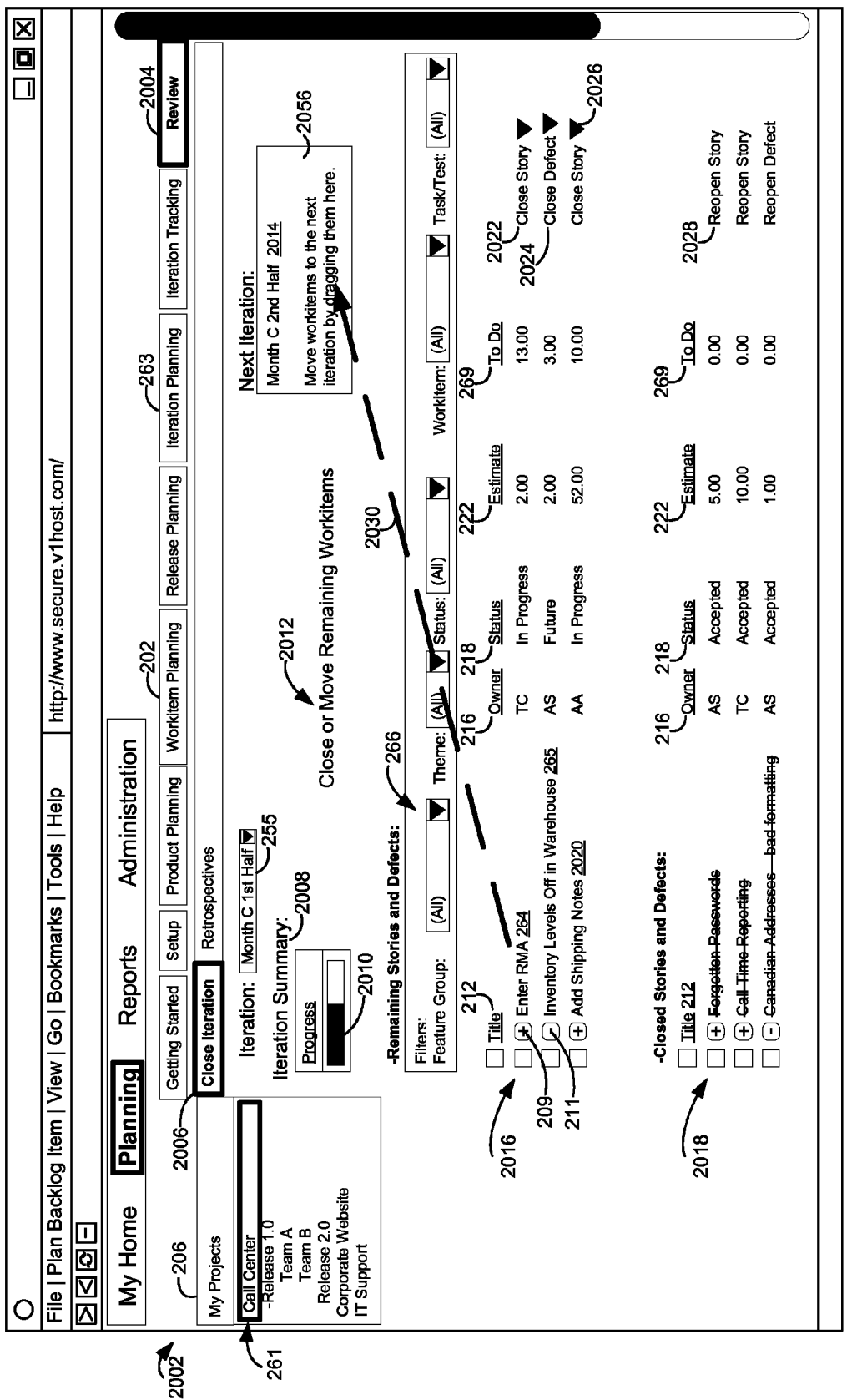
FIGS. 2E, 2F, 2H, 2K, and 2L are schematic screenshots of a user interface for transitioning between iterations of agile software development in accordance with some embodiments.

FIG. 2E is a schematic screenshot of a user interface 2002 for transitioning between iterations (i.e., between sprints) in accordance with some embodiments. Specifically, the UI 2002 enables users to close a particular iteration 255 ("Month C 1st Half") that is currently active ("the current iteration") and to activate a subsequent iteration 2014 ("Month C 2nd Half"). The iterations 255 and 2014 are associated with a project hierarchy level 261 selected in the project selection window 206. The UI 2002 may be used to conduct a review of the current iteration 255 and may be accessed by selecting one or more tabs, selection boxes, radio button icons, drop-down menu items, or the like (e.g., "Review" tab 2004 and "Close Iteration" tab 2006). In some embodiments, the UI 2002 displays summary information 2008 for the current iteration 255, such as a progress bar 2010 and one or more attributes (not shown) of the current iteration 255.

The UI 2002 displays a group 2016 of incomplete work items associated with the current iteration 255. For example, the group 2016 may include features (i.e., stories) (e.g., Enter RMA 264) and defects (e.g., Inventory Levels Off in Warehouse 265) scheduled to be completed or resolved in the current iteration 255. Various attributes (e.g., Title 212, Owner 216, Status 218, Estimate 222, and To Do 269) are displayed for the work items in the group 2016. The work items displayed in the group 2016 may be filtered using one or more filters 266. Each work item in the group 2016 is incomplete because it has a non-zero amount of work remaining to be done, as indicated by the To Do attribute 269. The Status attribute 218 also provides an indication that the work items in the group 2016 are incomplete. The UI 2002 displays instructions 2012 telling the user to disposition the incomplete work items in the group 2016 by closing them or moving them to a subsequent iteration. Because incomplete work items remain in the group 2016, the user is not yet provided with the option to close the current iteration 255 and activate the subsequent iteration 2014.

The UI 2002 also displays a group 2018 of complete (i.e., closed) work items, including various attributes 212, 216, 218, 222, and 269 of the work items in the group 2018. The zero To Do values 269, "Accepted" Status 218, and strikethrough display of the titles 212, as used in some embodiments, all indicate that the work items in the group 2018 are complete. The user may reopen a respective work item in the group 2018 by selecting a reopen link 2028 (e.g., by clicking on the link), in response to which the respective work item is removed from the group 2018 and added to the group 2016: the respective work item is now considered to be incomplete. In some embodiments, selection of the reopen link 2028 results in display of a user interface for editing attributes of the respective work item (e.g., for providing a To Do value 269).

Figure 2F:
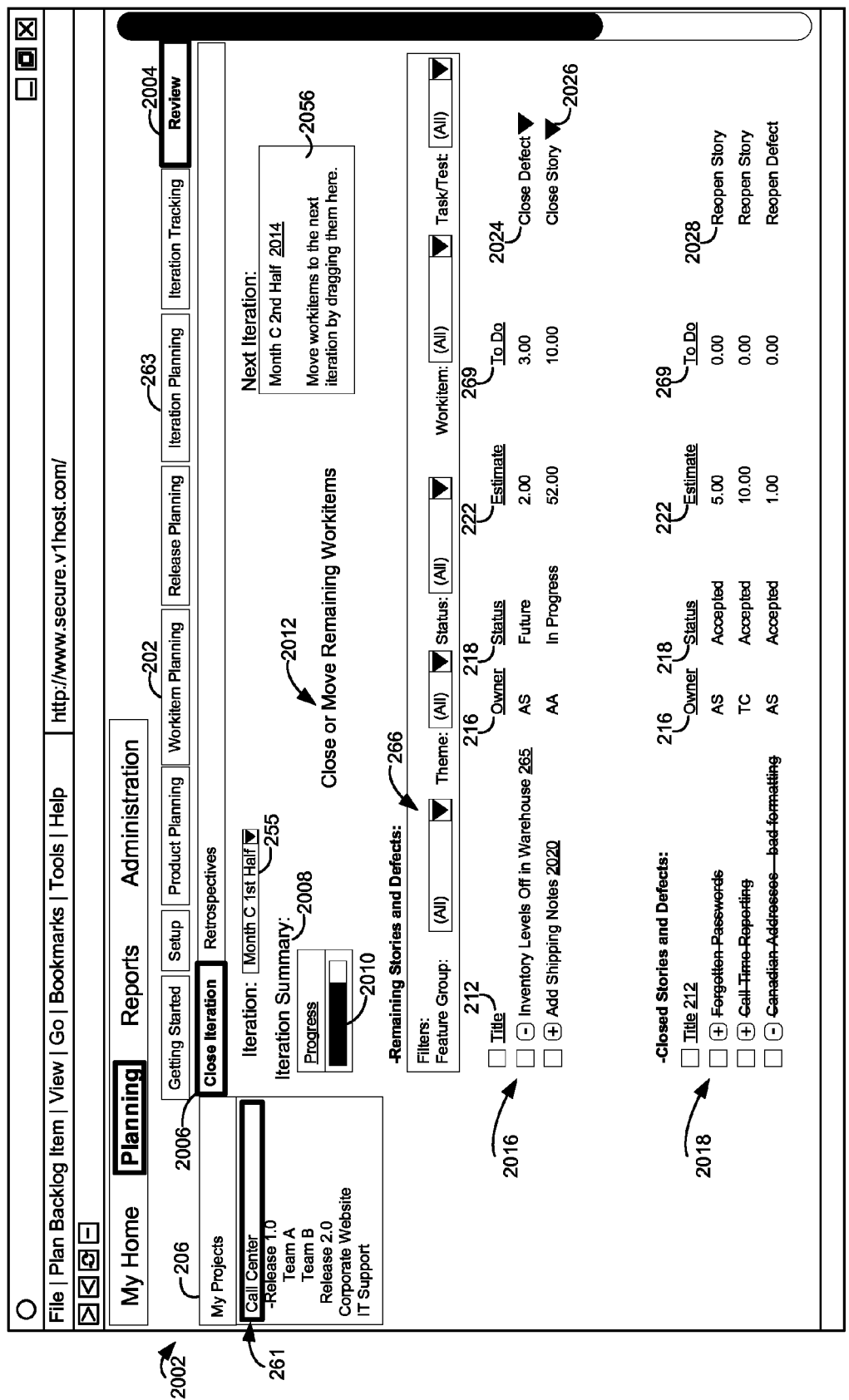

A field 2056 in the UI 2002 corresponds to the subsequent iteration 2014. The user may move an incomplete work item in the group 2016 to the subsequent iteration 2014 by dragging and dropping the work item onto the field 2056. For example, the user may perform a drag-and-drop operation 2030 (FIG. 2E) to move the Enter RMA feature 264 to the subsequent iteration 2014. As a result, as shown in FIG. 2F, Enter RMA 264 is no longer displayed in the group 2016, indicating that Enter RMA 264 is no longer associated with the current iteration 255 and thus is not scheduled to be completed in the current iteration 255. Instead, Enter RMA 264 is now associated with the subsequent iteration 2014 and is scheduled to be completed in the subsequent iterations 2014. In some embodiments, the field 2056 may be replaced by an icon, link, or other indicator associated with the subsequent iteration 2014. Other methods of moving a work item to a subsequent iteration are possible, such as selecting an appropriate command from a menu (not shown).

Figure 2H:
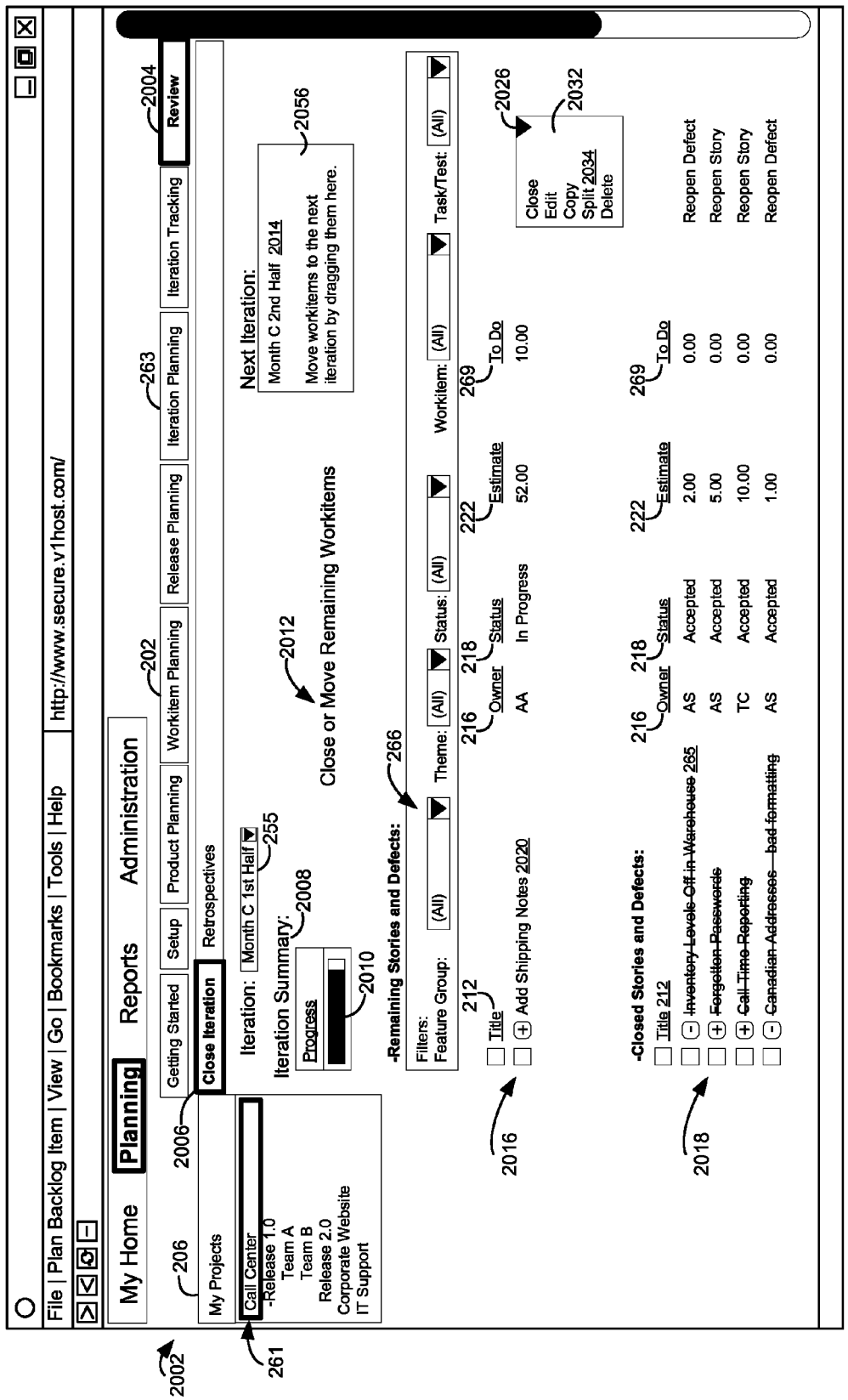

In addition to moving an incomplete work item to a subsequent iteration, the UI 2002 enables the user to close incomplete work items. The user may desire to close a work item, for example, if the work item actually has been completed but the status of the work item has not yet been updated in the agile development management software to reflect its completion. To close a work item, the user selects a close story link 2022 or close defect link 2024. For example, in some embodiments, selection of the close defect link 2024 for the Inventory Levels Off in Warehouse defect 265 results in display of the UI 2040 (FIG. 2G) in accordance with some embodiments. The UI 2040 displays various attributes 2042 (e.g., 212, 214, 269, 218, and 2044) of the Inventory defect 265, and includes drop-down menu selectors 2052 and 2054 for updating the Status 218 and Resolution 2054 of the Inventory defect 265. For example, the Status 218 may be updated to "Accepted" and the Resolution 2044 to "Fixed," indicating that the Inventory defect 265 was successfully resolved during the current iteration 255. In response to user selection of the Close Defect button 2048, the user is returned to the UI 2002 (FIG. 2H), in which the Inventory defect 265 is no longer displayed in the group 2016 of incomplete work items and instead is displayed in the group 2018 of complete work items. In some embodiments, closing a work item automatically sets its To Do 269 attribute to zero, as shown in FIG. 2H for the Inventory Defect 265. In response to user selection of the Cancel button 2050, the user is returned to the UI 2002 (FIG. 2F), and the Inventory defect 265 is still displayed in the group 2016 of incomplete defects.

In some embodiments, the Close Defect button 2048 in the UI 2040 (FIG. 2G) is not displayed until the Status 218 and/or Resolution 2044 have been updated to indicate that the Inventory defect 265 has been resolved. Alternatively, selection of the Close Defect button 2048 automatically updates relevant attributes (e.g., Status 218, Resolution 2044, and/or To Do 269) to indicate that the defect 265 has been resolved, allowing the user to close the defect 265 without updating any attributes of the defect 265. In other embodiments, the UI 2040 is not present; instead, execution of a close work item command (e.g., selection of a close work item link, such as the close defect link 2024 or close story link 2022, FIG. 2E) in the UI 2002 results in the work item being moved from the group 2016 to the group 2018 (e.g., as illustrated for the Inventory defect 265 in FIG. 2H) and its attributes being automatically updated to reflect that it has been closed (e.g., Status 218 is changed to Accepted and To Do 269 is zeroed out).

While the UI 2040 (FIG. 2G) has been described with regard to closing a defect, a similar UI may be accessed (e.g., by selecting a Close Story link 2022, FIG. 2E) for closing a feature or other incomplete work item associated with the current iteration 255.

An incomplete work item in the group 2016 may include a plurality of constituent work items, some of which may be complete and some of which may be incomplete. For example, an incomplete feature or defect in the group 2016 may include constituent tasks and/or tests, some of which are complete and some of which are incomplete. The incomplete work item may be split into two separate work items, referred to as the original work item and the new work item, with the constituent work items divided between them such that all complete constituent work items are associated with the original work item and all incomplete constituent work items are associated with the new work item. The new work item then may be moved (e.g., automatically) to the subsequent iteration 2014 to allow the current iteration 255 to be closed.

In the UI 2002 (FIG. 2H), the user may split the Add Shipping Notes work item 2020 by selecting the drop-down menu selector 2026 and then selecting the Split command 2034 from the resulting drop-down menu 2032. In response, a UI 2100 (FIG. 2I) for splitting the Add Shipping Notes work item 2020 is displayed in accordance with some embodiments. The UI 2100 displays an original backlog item 2104 and a new backlog item 2122. Prior to splitting the work item 2020, a group 2108 of constituent work items associated with the work item 2020 (e.g., tasks and tests to be performed to complete the work item 2020) are displayed for the original backlog item 2104. Some of the constituent work items in the group 2108 (e.g., 2110 and 2118) are complete, as indicated by the zero values of their To Do attributes 269; others (e.g., 2112, 2114, 2116, and 2120) are incomplete, as indicated by the non-zero values of their To Do attributes 269. Because the work item 2020 has not yet been split, no constituent work items are associated with the new backlog item 2122, as indicated by the "No Results" message 2124.

To split the work item 2020, the user selects the Split button 2102. In response, as illustrated in FIG. 2J, the incomplete constituent work items previously displayed in the group 2108 are moved to the new backlog item 2122 and displayed in a group 2132 of constituent work items associated with the new backlog item 2122. The complete constituent work items previously displayed in the group 2108 are not moved; they remain associated with the original backlog item 2104 and are displayed in a group 2130 of constituent work items associated with the original backlog item 2104. (In the example of FIG. 2J, both the new 2104 and original 2122 backlog items have the same title 212, "Add Shipping Notes" 2020). Because all constituent work items of the original backlog item 2104 now have zero To Do attributes 269, the To Do attribute 269 of the original backlog item 2104 is automatically updated to zero, indicating that it is complete. In some embodiments, the split operation automatically updates other attributes of the original backlog item 2104 (e.g., Status 218 and/or Resolution 2044) to indicate that the original backlog item 2104 is complete.

Figure 2K:
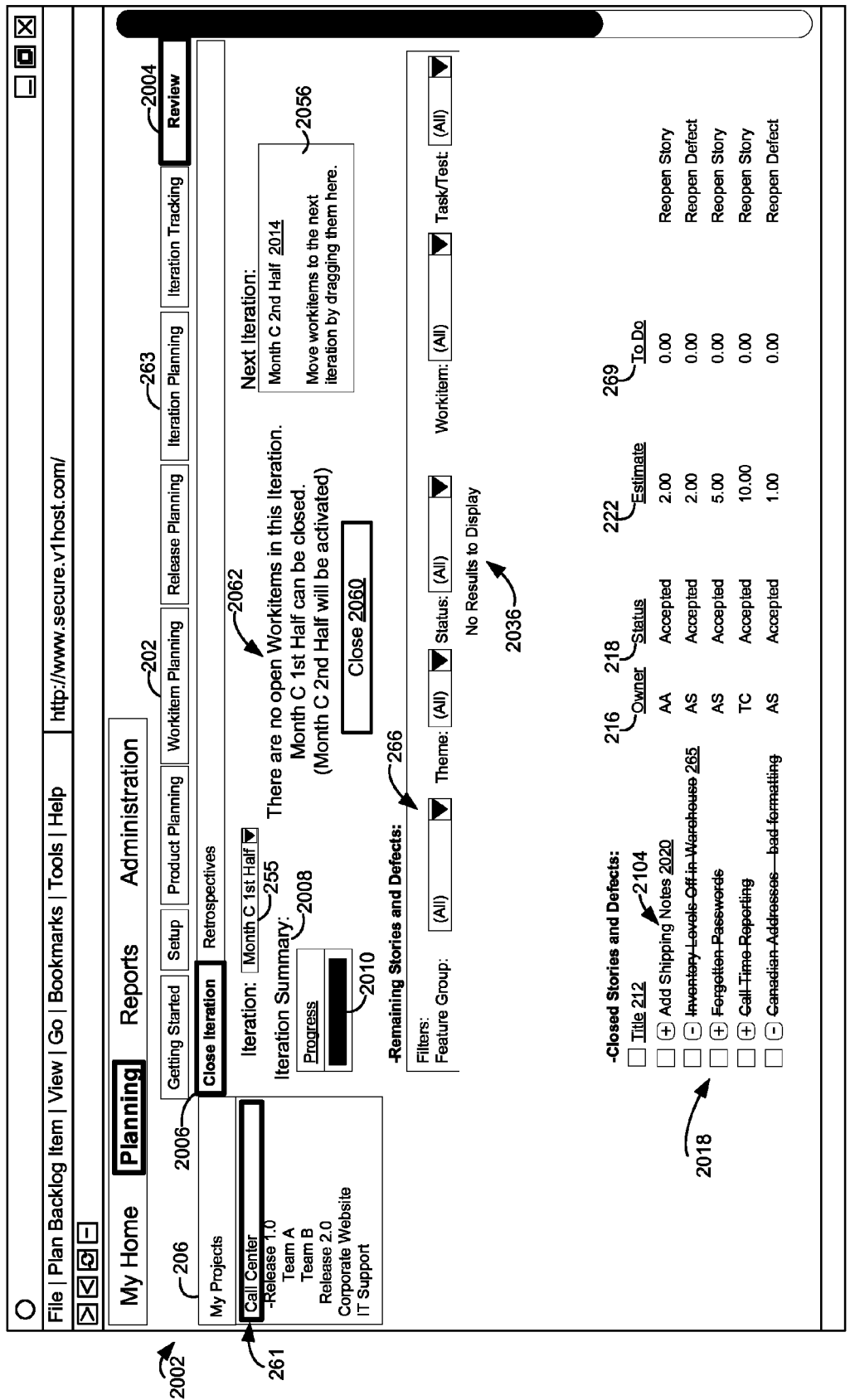

If the user decides not to implement this split, the user may select the Cancel button 2128 and return to the UI 2002 as shown in FIG. 2H. Alternatively, to implement this split, the user may select the OK button 2126. In response to selecting the OK button 2126, the user is returned to the UI 2002, as shown in FIG. 2K. As a result of the split operation, Add Shipping Notes 2020 is no longer listed as an incomplete work item under Remaining Stories and Defects. Instead, the post-split original backlog item 2104 is listed in the group 2018 (FIG. 2K) of complete work items. The new backlog item 2122 is not displayed in the UI 2002 (FIG. 2K), because it is not associated with the current iteration 255: it was automatically associated with the next iteration 2014 as a result of the split operation.

In some embodiments, the UI 2100 (FIGS. 2I-2J) is omitted. Instead, a work item is automatically split into the original backlog item 2104 and new backlog item 2122 in response to selection of the Split command 2034 (FIG. 2H), resulting in a direct transition from FIG. 2H to FIG. 2K.

Figure 2L:
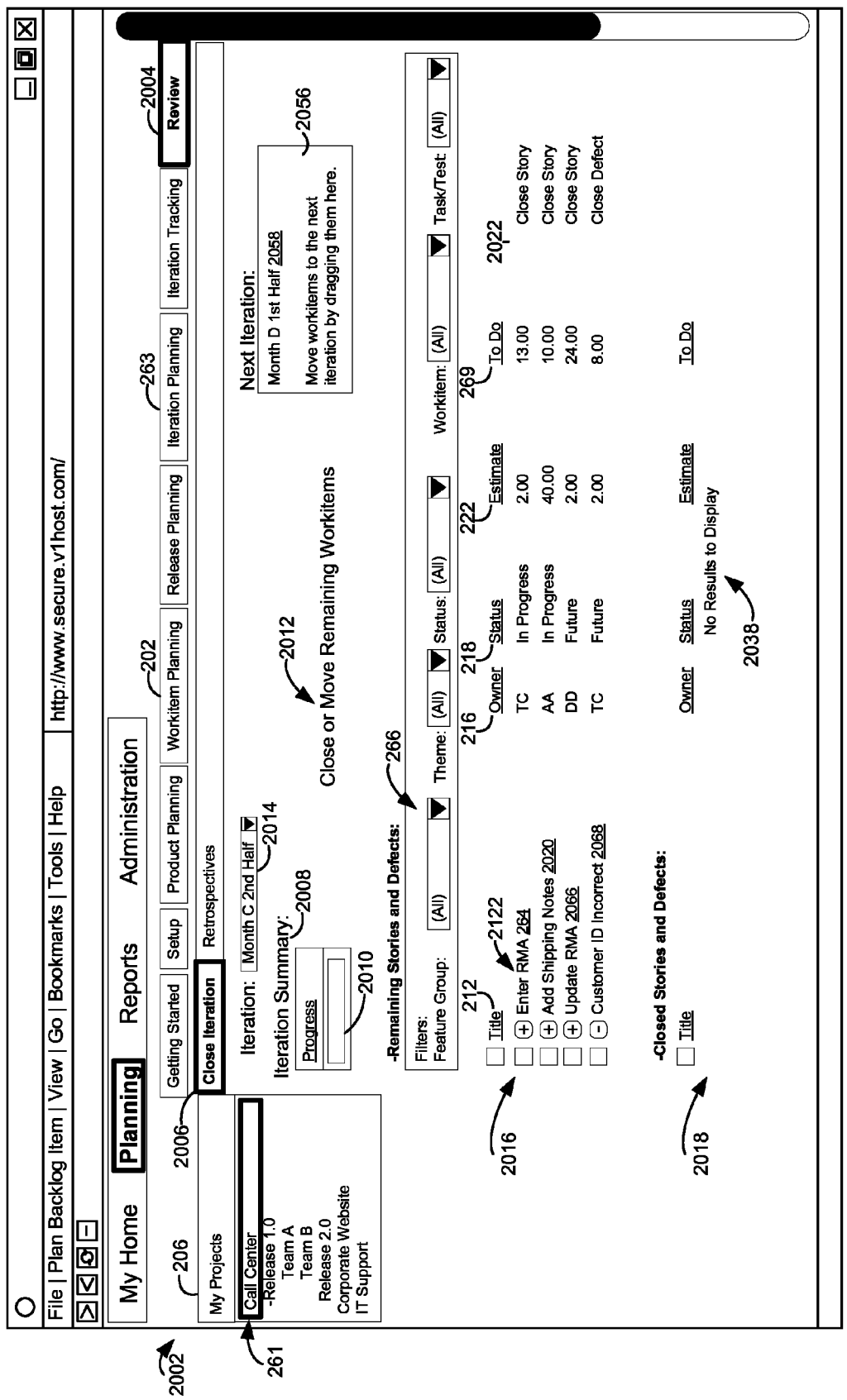

In the UI 2002 (FIG. 2K), a message 2036 indicates that no incomplete work items remain associated with the current iteration 255. When the agile development management software (e.g., agile development management module 520, FIG. 5, as executed by the computer 500, FIG. 5) determines that no incomplete work items remain associated with the current iteration 255, a Close Iteration button 2060 is displayed in the UI 2002 and a message 2062 informs the user that the current iteration 255 can be closed. In response to user selection of the Close Iteration button 2060, the current iteration 255 is closed and the next iteration 2014 is activated, such that the next iteration 2014 replaces the current iteration 255 as the currently active iteration (e.g., as the iteration against which progress on associated work items may be recorded in the agile development management software). Display of work items associated with the current iteration 255 is ceased and the UI 2002 is updated to display work items associated the iteration 2014, as shown in FIG. 2L in accordance with some embodiments. Specifically, a group 2016 (FIG. 2L) of incomplete work items associated with the iteration 2014 is displayed. The group 2016 includes Enter RMA 264, which was moved to the iteration 2014 from the previous iteration 255, and the new backlog item 2122 for Add Shipping Notes 2020, which was split from the previous iteration 255, as well as other work items 2066 and 2068 that have been associated with the iteration 2014 (e.g., that were assigned to the iteration 2014 during the iteration planning process 106, FIG. 1). No group 2018 of complete work items is displayed, because no work items associated with the iteration 2014 have been completed yet, as indicated by the message 2038. The field 2056 in the UI 2002 is now associated with the iteration 2058 ("Month D 1st Half") that follows the iteration 2014 ("Month C 2nd Half") and allows the user to move work items from the iteration 2014 to the iteration 2058.

In some embodiments, instead of displaying the Close Iteration button 2060 (FIG. 2K), the current iteration 255 is automatically closed and the subsequent iteration 2014 is automatically updated in response to the determination that no incomplete work items remain associated with the current iteration 255, and display of the UI 2002 is automatically updated as illustrated in FIG. 2L.

The UI 2002 (FIGS. 2E-2F, 2H, and 2K-2L) thus provides the user with flexibility when transitioning between iterations: the user may close incomplete work items, move them forward to a subsequent iteration, or split them into complete and incomplete portions and move the incomplete portions forward, all from a single user interface. By not displaying the Close Iteration button 2060 (FIG. 2K) until no incomplete work items for the iteration remain, the UI 2002 ensures that no incomplete work items are ignored when closing an iteration. This aspect of the UI 2002 is particularly useful because user selection of one or more filters 266 may result in some incomplete work items not being displayed in the group 2016, creating a risk that these work items might be ignored.

Figure 3A:
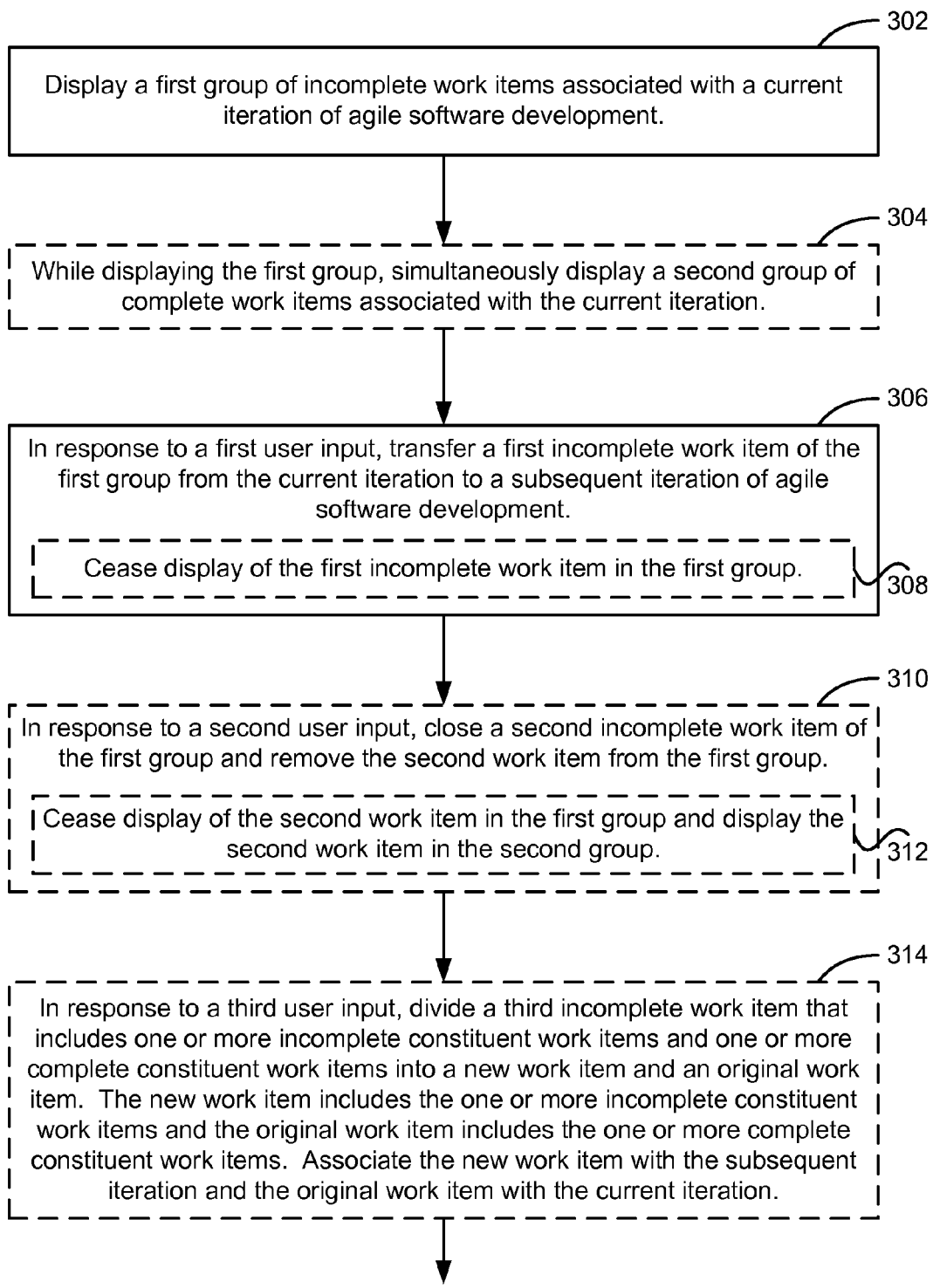
FIGS. 3A-3B are flow diagrams illustrating a computer-implemented method of transitioning between iterations of agile software development in accordance with some embodiments.
Figure 3B:
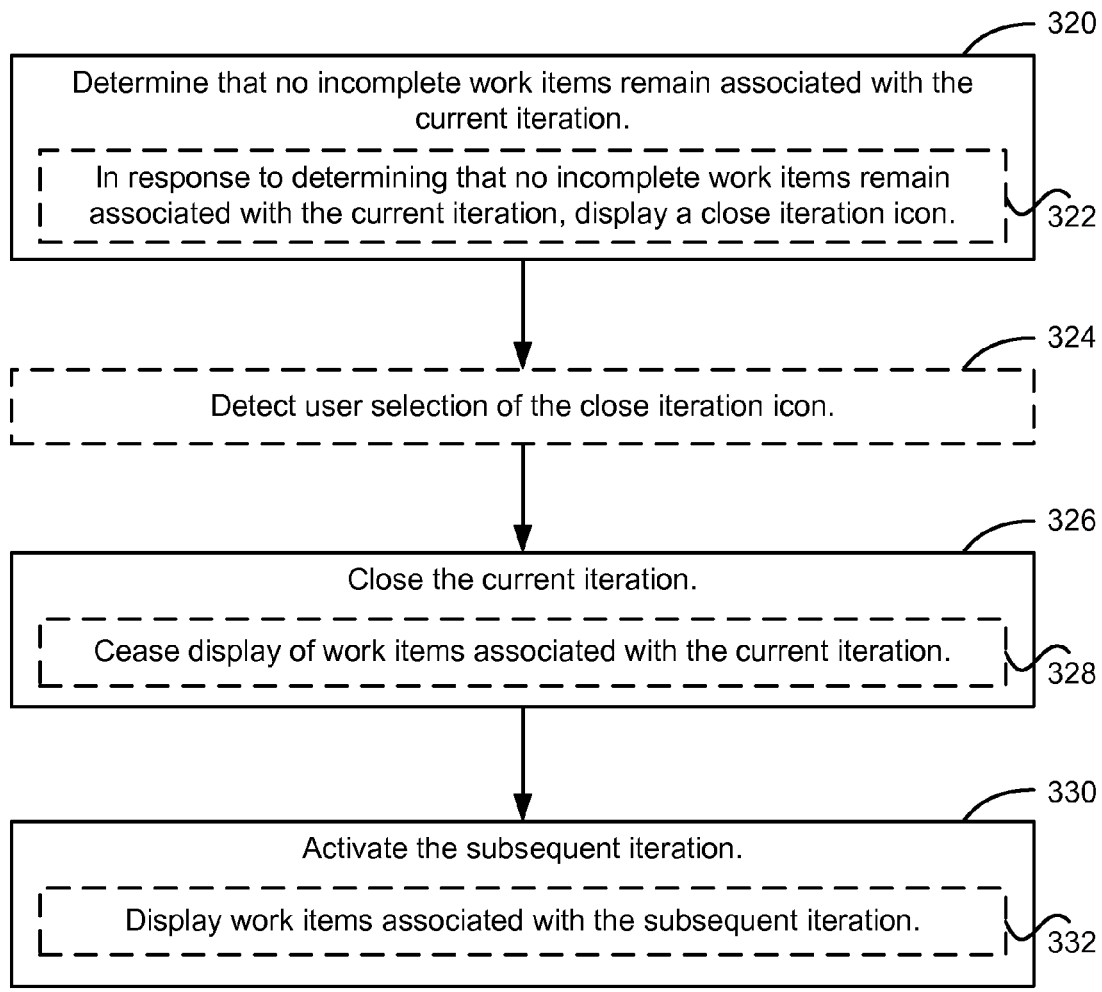

FIGS. 3A-3B are flow diagrams illustrating a computer-implemented method 300 of transitioning between iterations of agile software development in accordance with some embodiments. The method 300 is performed by agile development management software (e.g., agile development management module 520, FIG. 5) executed on one or more computers (e.g., computer 500, FIG. 5)

A first group of incomplete work items (e.g., group 2016, FIG. 2E) associated with a current iteration of agile software development (e.g., iteration 255, FIG. 2E) is displayed (302, FIG. 3A). In some embodiments, the first group of incomplete work items includes features (e.g., Enter RMA 264, FIG. 2E) and defects (e.g., Inventory Levels Off in Warehouse 265, FIG. 2E) associated with the current iteration.

In some embodiments, while the first group is being displayed, a second group of complete work items (e.g., group 2018, FIG. 2E) associated with the current iteration is simultaneously displayed (304). In some embodiments, while the first group is being displayed, an indicator (e.g., field 2056, FIG. 2E) corresponding to a subsequent iteration is displayed.

In response to a first user input, a first incomplete work item of the first group is transferred (306) from the current iteration to the subsequent iteration of agile software development. In some embodiments, the first user input includes dragging and dropping the first incomplete work item from the first group onto the indicator corresponding to the subsequent iteration (e.g., drag-and-drop operation 2030, FIG. 2E). In some embodiments, display of the first incomplete work item in the first group is ceased (308). For example, in FIG. 2F, in response to the drag-and-drop operation 2030, the Enter RMA feature 264 is no longer displayed.

In some embodiments, in response to a second user input (e.g., user selection of the Close Defect link 2024, FIG. 2F, and/or the Close Defect button 2048, FIG. 2G), a second incomplete work item of the first group (e.g., the Inventory defect 265, FIG. 2F) is closed (310) and the second work item is removed from the first group. In some embodiments, display of the second work item in the first group is ceased (312) and the second work item is displayed in the second group (e.g., in the group 2018, FIG. 2H). In some embodiments, the second work item is a defect associated with the second iteration and closing the second work item includes updating a status of the defect (e.g., Status 218 or Resolution 2044, FIG. 2G) to indicate that the defect has been resolved. In some embodiments, the second incomplete work item is a feature associated with the second iteration and closing the second incomplete work item includes updating a status of the feature (e.g., Status 218, FIG. 2H) to indicate that the feature has been implemented. In some embodiments, closing the second work item includes automatically updating one or more attributes of the second work item to indicate that no work remains to be done.

In some embodiments, in response to a third user input (e.g., user selection of the Split command 2034, FIG. 2H, and/or the Split button 2102 and OK button 2126, FIGS. 2I-2J), a third incomplete work item (e.g., Add Shipping Notes 2020, FIG. 2H) that includes one or more incomplete constituent work items and one or more complete constituent work items is divided (314) into a new work item (e.g., new backlog item 2122, FIG. 2J) and an original work item (e.g., original backlog item 2104, FIG. 2J). The new work item includes the one or more incomplete constituent work items and the original work item includes the one or more complete constituent work items. The new work item is associated with the subsequent iteration and the original work item is associated with the current iteration. In some embodiments, a status of the original work item indicates that no work remains to be done for the original work item.

In some embodiments, the third incomplete work item is a feature or defect associated with the current iteration. In some embodiments, the one or more incomplete constituent work items and/or the one or more complete constituent work items include a task and/or a test associated with the feature or defect.

A determination is made (320, FIG. 3B) that no incomplete work items remain associated with the current iteration. The current iteration is closed (326) and the subsequent iteration is activated (330).

In some embodiments, a close iteration icon (e.g., button 2060, FIG. 2K) is displayed (322) in response to the determination that no incomplete work items remain associated with the current iteration. User selection of the close iteration icon is detected (324), in response to which the current iteration (e.g., iteration 255, FIG. 2K) is closed and the subsequent iteration (e.g., iteration 2014, FIG. 2K) is activated. Furthermore, in some embodiments, in response to detecting user selection of the close iteration icon, display of work items associated with the current iteration is ceased (328) and work items associated with the subsequent iteration are displayed (332) (e.g., as illustrated in FIG. 2L).

The method 300 thus provides a user-friendly, flexible, and robust way to transition between iterations in agile software development: the user may move, close, and/or split work items through a single interface. While the method 300 includes a number of operations that appear to occur in a specific order, it should be apparent that the method 300 can include more or fewer operations, which can be executed serially or in parallel. An order of two or more operations may be changed and two or more operations may be combined into a single operation. For example, the order of operations 306, 310, and 314 may be varied and one or more of operations 306, 310, and 314 may be omitted.

Figure 4:
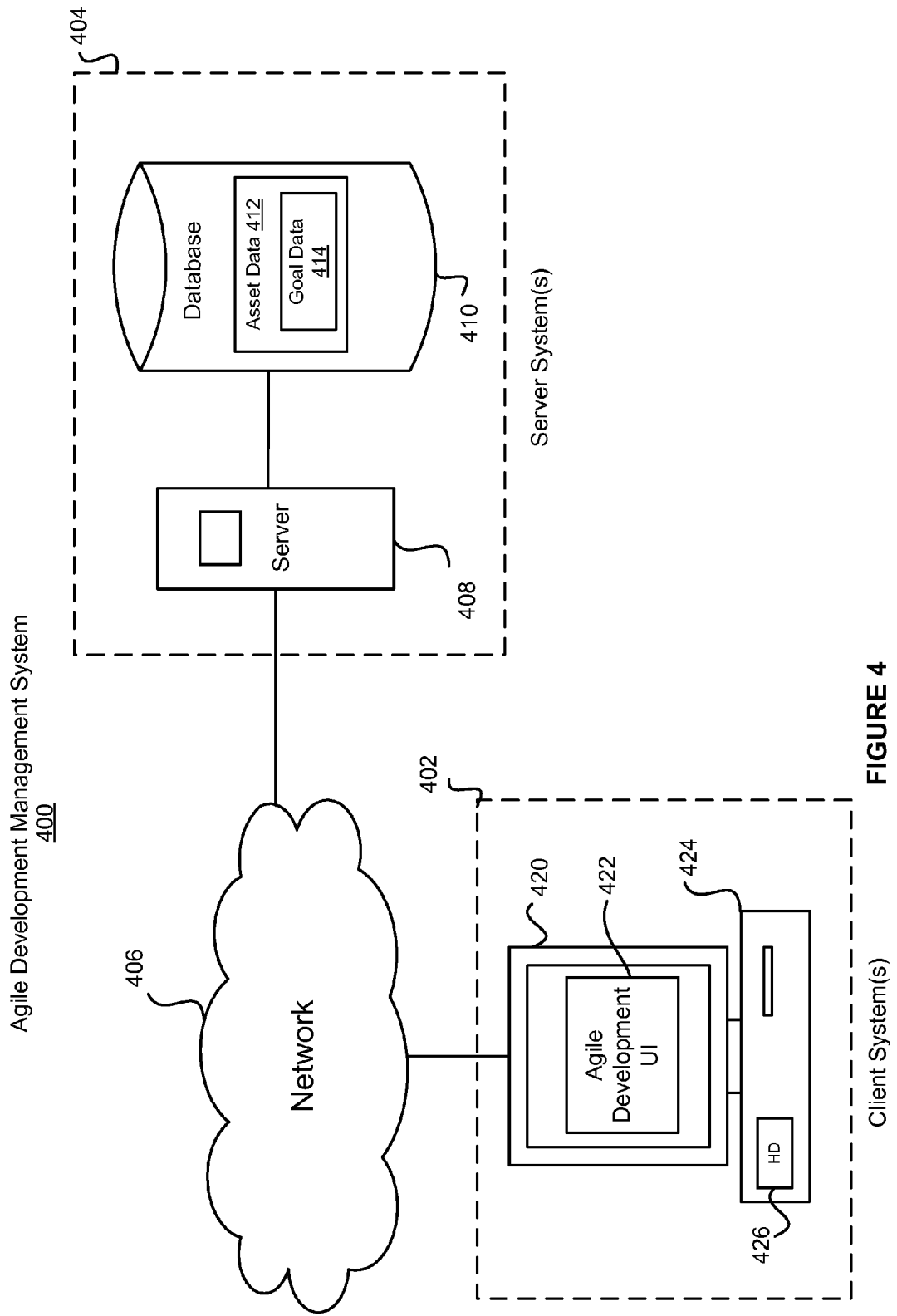
FIG. 4 is a block diagram illustrating an agile development management system in accordance with some embodiments.

FIG. 4 is a block diagram illustrating an agile development management system 400 in accordance with some embodiments. The agile development management system 400 includes a server system 404 coupled to one or more client systems 402 by a network 406. The client systems 402 may include client systems associated with respective users such as software developers, testers, managers, clients, customers, vendors, and any other parties involved in agile software development. The network 406 may be any suitable wired and/or wireless network and may include a local area network (LAN), wide area network (WAN), virtual private network (VPN), the Internet, metropolitan area network (MAN), or any combination of such networks.

The server system 404 includes a server 408 and a database 410. Server 408 serves as a front-end for the server system 404. Server 408, sometimes called a front end server, provides an interface between the server system 404 and the client systems 402. In some embodiments, the functions of server 408 may be divided or allocated among two or more servers.

Figure 7:
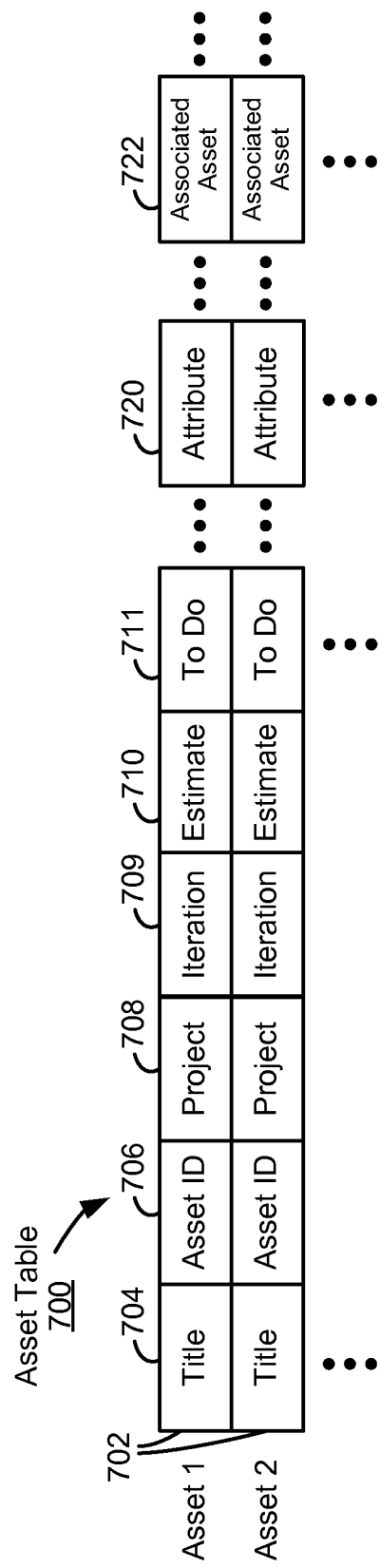
FIG. 7 is a diagram illustrating a data structure for assets in accordance with some embodiments.

The server system 404 stores data relating to the agile development process, including asset data 412. The asset data 412 includes attributes for respective assets. An exemplary data structure 700 for asset data 412 is illustrated in FIG. 7, described below.

It should be appreciated that the server system 404, including the server 408 and the database 410, may be implemented as a distributed system of multiple computers. However, for convenience of explanation, the server system 404 is described herein as being implemented on a single computer, which can be considered a single logical system.

A user interfaces with the server system 404 at a client system or device 402 (hereinafter called the client system for ease of reference). The client system 402 includes a computer 424 or computer controlled device, such as a personal digital assistant (PDA), cellular telephone or the like. The computer 424 typically includes one or more processors (not shown); memory, which may include volatile memory (not shown) and non-volatile memory such as a hard disk drive 426; and a display 420. The computer 424 may also have input devices such as a keyboard and a mouse (not shown).

In some embodiments, a user may interact with the server system 404 via an agile development user interface 422 presented on the display 420. Examples of user interfaces 422 are illustrated in FIGS. 2A-2L. In some embodiments, the agile development user interface 422 may be a web-based user interface. That is, the user interface 422 includes one or more web pages. It is noted that a single web page can contain multiple frames, each of which may appear (when displayed by a browser application) to be a distinct web page. The web page(s) may be written in the Hypertext Markup Language (HTML), Extensible Markup Language (XML), or any other suitable language for preparing web pages, and may include one or more scripts for interfacing with the server system 404. For example, the web page(s) may include a JavaScript application that interfaces with the server system 404 via an application programming interface (API). The JavaScript application receives asset data and reporting data from the server system 404, manages the rendering of that data at the client, and also performs the client-side aspects of other tasks, such as receiving user input for transitioning between iterations, and transmitting user requests to the server system 404.

In some other embodiments, the agile development user interface 422 may be a part of a stand-alone application that is run on the client system 402. The standalone application may interface with the server system 404 via an application programming interface (API).

The agile development management system 400 may perform the method 300 (FIGS. 3A-3B) in accordance with some embodiments. In some embodiments, performance of various operations in the method 300 may be divided between the client system 402 and server system 404. Alternatively, the method 300 may be performed entirely at the client system 402.

Instead of using a client-sever model, the agile development management software may be installed and used on a single computer system combining the functionalities of the server system 404 and client system 402. For example, the method 300 (FIGS. 3A-3B) may be performed entirely on a single computer system.

Figure 5:
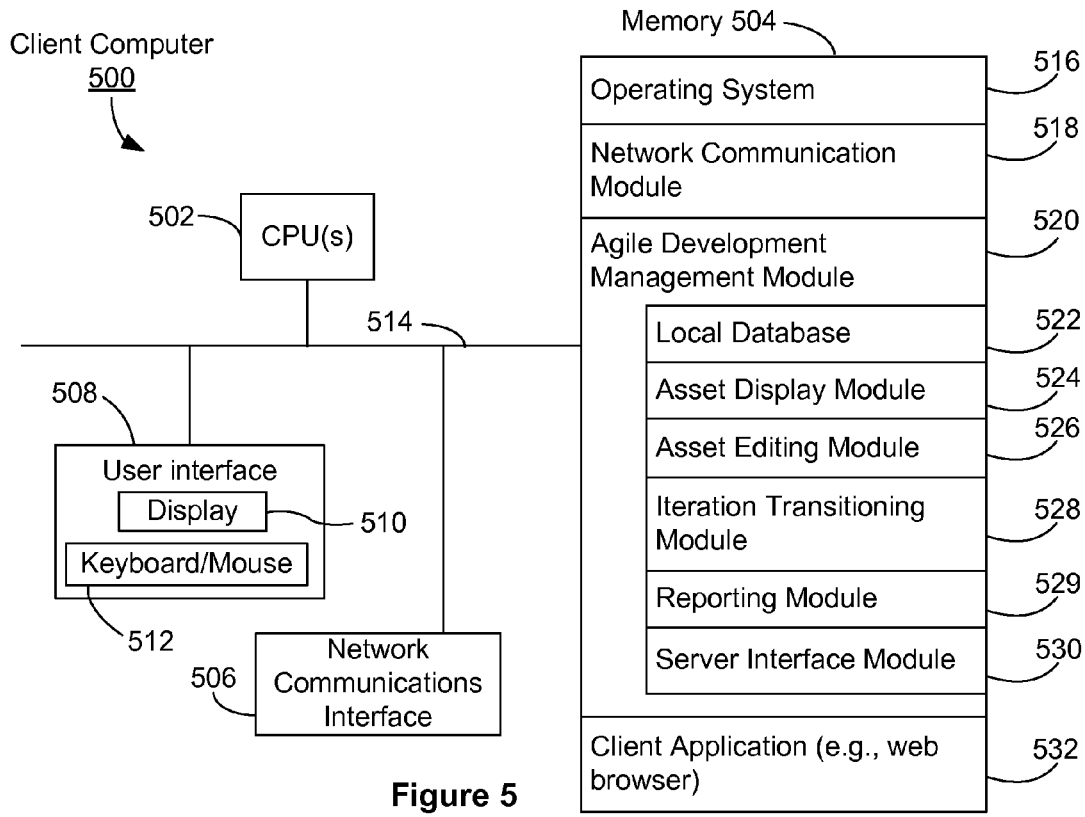
FIG. 5 is a block diagram illustrating a client computer in accordance with some embodiments.

FIG. 5 is a block diagram illustrating a client computer in accordance with some embodiments. The client computer 500, which may be used as a client system 402 (FIG. 4), typically includes one or more processing units (CPUs) 502, one or more network or other communications interfaces 506, memory 504, and one or more communication buses 514 for interconnecting these components. The communication buses 514 may include circuitry (sometimes called a chipset) that interconnects and controls communications between system components. The client computer 500 may also include user interface hardware 508 comprising a display device 510 and a keyboard and/or mouse (or other pointing device) 512. Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. Memory 504, or alternately non-volatile memory device(s) within memory 504, comprises a computer readable storage medium. In some embodiments, memory 504 stores the following programs, modules, and data structures, or a subset thereof:

- an operating system 516 that includes procedures for handling various basic system services and for performing hardware dependent tasks;
- a network communication module 518 that is used for connecting the client computer 500 to other computers via the one or more communication network interfaces 506 and one or more communication networks, such as the Internet, other wide area networks, local area networks, metropolitan area networks, and so on;
- an agile development management module 520 for handling data relating to the agile development process; and
- a client application 532, such as a web browser.

In some embodiments, the agile development management module 520 includes a local database 522 for storing data sent by the server (e.g., asset data and reporting data), an asset display module 524 for displaying assets (e.g., via UI 200, FIG. 2A, UI 251, FIG. 2B, or UI 2002, FIG. 2E) and for displaying an asset's attributes and related assets (e.g., via window 290, FIGS. 2C-2D, or UI 2100, FIGS. 2I-2J), an asset editing module 526 for updating attribute values (e.g., in accordance with data entered via user input fields), an iteration transitioning module 528 for transitioning between iterations (e.g., via UIs 2002, 2040, and 2100, FIGS. 2E-2L), a reporting module 529 for displaying reporting, and a server interface module 530 for interfacing with server computer 500. In some embodiments, the iteration transitioning module 528, asset display module 524, and/or asset editing module 526 correspond to instructions for performing all or a portion of the operations in the method 300 (FIGS. 3A-3B). In some embodiments, the server interface module 530 includes a cache for storing data to be transmitted to the server.

In some embodiments, the agile development management module 520 may be a script-based module, embedded in a web page served from the server system 404 (FIG. 4). The web page may be rendered by a client application 532, such as a web browser, at the client computer 500. When the web page is rendered, the agile development management module 520 is executed, thereby providing a web-based interface to the server system 404. The script-based agile development management module may be written in JavaScript, AJAX, ECMAScript, Perl, or any other suitable scripting language.

In some other embodiments, the agile development management module 520 may be a standalone application stored in memory 504 of the client computer 500.

Each of the above identified elements in FIG. 5 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 504 may store a subset of the modules and data structures identified above. Furthermore, memory 504 may store additional modules and data structures not described above.

Figure 6:
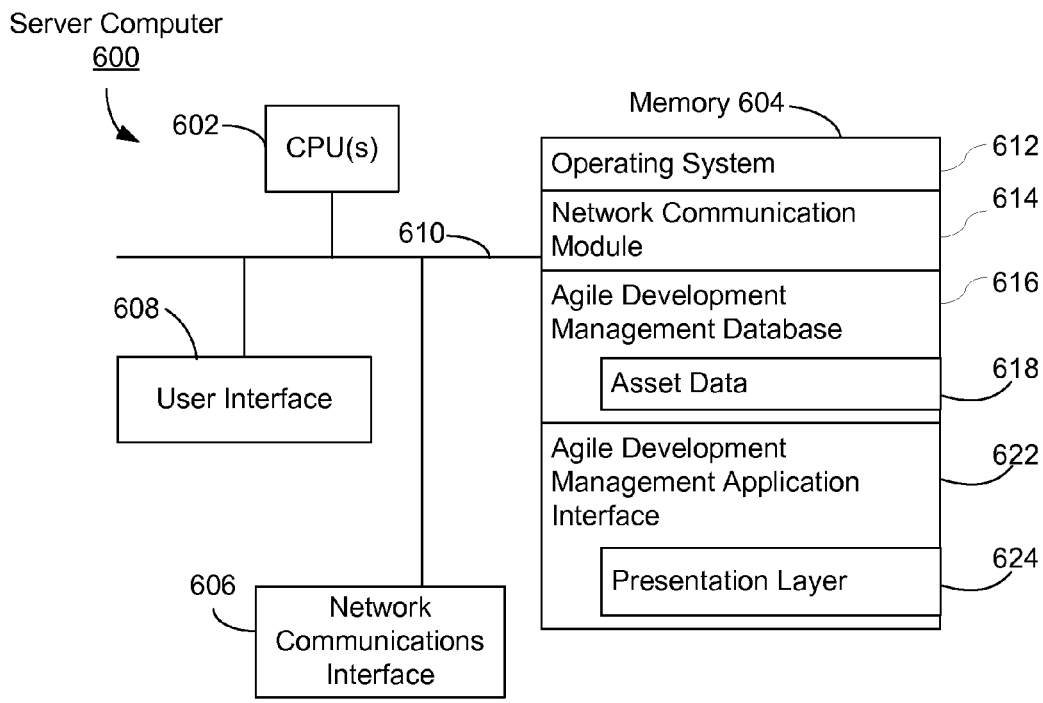
FIG. 6 is a block diagram illustrating a server computer in accordance with some embodiments.

FIG. 6 is a block diagram illustrating a server computer 600 in accordance with some embodiments. The server computer 600, which may be used as a server system 404

(FIG. 4), typically includes one or more processing units (CPUs) 602, one or more network or other communications interfaces 606, memory 604, and one or more communication buses 610 for interconnecting these components. The communication buses 610 may include circuitry (sometimes called a chipset) that interconnects and controls communications between system components. The server system 600 optionally may include user interface hardware 608, which may include a display device (not shown), and a keyboard and/or a mouse (not shown). Memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 604 may optionally include one or more storage devices remotely located from the CPU(s) 602. Memory 604, or alternately non-volatile memory device(s) within memory 604, comprises a computer readable storage medium. In some embodiments, memory 604 stores the following programs, modules and data structures, or a subset thereof:
- an operating system 612 that includes procedures for handling various basic system services and for performing hardware dependent tasks;
- a network communication module 614 that is used for connecting the server system 600 to other computers via the one or more communication network interfaces 606 and one or more communication networks, such as the Internet, other wide area networks, local area networks, metropolitan area networks, and so on;
- an agile development management database 616 for storing data relating to the agile development process, including asset data 618; and
- an agile development management application programming interface (API) 622 for exchanging information with the agile development management modules 520 in one or more client computers 500.

In some embodiments, the asset data 618 includes work items associated with respective iterations. In some embodiments, the agile development management database 616 includes database management software for performing one or more operations in the method 300 (FIGS. 3A-3B). In some embodiments, the application interface 622 includes a presentation layer 624 for rendering user interfaces (e.g., FIGS. 2A-2L) accessed by a client system 402.

Each of the above identified elements in FIG. 6 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 604 may store a subset of the modules and data structures identified above. Furthermore, memory 604 may store additional modules and data structures not described above.

Although FIG. 6 shows a "server computer," FIG. 6 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers.

The agile development management database 616 stores data in various tables. For example, an "Asset Type" table includes an entry for each kind of asset, such as feature group, feature, defect, task, or test. An "Attribute Definition" table defines the attributes associated with each kind of asset listed in the "Asset Type" table. A "Synthetic Attribute" table references formulas used to calculate synthetic attributes. For example, if a work estimate or degree of completion is defined as a roll-up of estimates or degrees of completion for other assets, the roll-up may be specified in a Synthetic Attribute table. An "Attribute Security Check" table contains references to operations used to determine whether a user may access or modify particular attributes. For attributes that are associated assets, a "Relation Definition" table defines relationships between assets. In addition, a "Many to Many Relation Definition" table may contain relationship information for assets in many-to-many relationship with other assets. Other tables may specify business rules for various assets.

Attribute values for particular assets are stored in asset tables 700, as illustrated in FIG. 7 in accordance with some embodiments. In some embodiments, a table 700 corresponds to a particular type of asset, such as feature group, feature, defect, task, or test. The asset table 700 includes a row 702 for each respective asset stored in the table. Each row includes fields that contain values for attributes of the respective asset, as defined in the "Attribute Definition" table. For example, the attribute fields may include title 704, asset ID 706, project 708, iteration 709, estimate 710, to do 711, and various other attributes 720 (e.g., progress/degree of completion, status, resolution, etc.). The asset table 700 also includes fields 722 to specify other attributes that are associated (i.e., related) assets. For example, if a respective asset is a feature or defect, fields 722 may specify tasks and tests associated with the feature or defect, for example by providing the asset IDs of the tasks and tests.

The tables 700 thus include information to allow the agile development management application interface 622 to respond to a request from a client computer 500 when a user seeks to create, display, and modify assets. The interface 622 can access the asset tables 700 (e.g., by writing to or querying the tables 700) in response to requests from the client computer 500.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of transitioning between iterations of agile software development, wherein agile development management software executed on one or more computers associates work items with iterations, the method comprising:
    displaying on a display of the one or more computers a first group of incomplete work items associated with a current iteration of agile software development;

receiving, by the one or more computers, a first user input; and in response to receiving the first user input:
automatically transferring, by the one or more computers, a first incomplete work item of the first group from the current iteration to a subsequent iteration of agile software development;
determining, by the one or more computers, that no incomplete work items remain associated with the current iteration;
closing, by the one or more computers, the current iteration; and
activating, by the one or more computers, the subsequent iteration.

2. The computer-implemented method of claim 1, further comprising: prior to determining, by the one or more computers, that no incomplete work items remain associated with the current iteration,
receiving, by the one or more computers, a second user input; and
in response to receiving the second user input:
dividing, by the one or more computers, a second incomplete work item into a new work item and an original work item, the new work item comprising one or more incomplete constituent work items, wherein the second incomplete work item comprises a plurality of constituent work items, including the one or more incomplete constituent work items and one or more complete constituent work items, the second incomplete work item is a feature or defect associated with the current iteration, and the plurality of constituent work items comprises a task or a test associated with the feature or defect; and
associating, by the one or more computers, the new work item with the subsequent iteration, wherein the original work item is associated with the current iteration.

3. The computer-implemented method of claim 2, wherein the original work item comprises the one or more complete constituent work items.

4. The computer-implemented method of claim 2, wherein a status of the original work item indicates that no work remains to be done for the original work item.

5. The computer-implemented method of claim 2, wherein:
closing, by the one or more computers, the current iteration includes automatically closing, by the one or more computers, the current iteration without further user input; and
activating, by the one or more computers, the subsequent iteration includes:
automatically updating, by the one or more computers, the current iteration to be the subsequent iteration; and
displaying, by the one or more computers, the one or more incomplete constituent work items associated with the current iteration.

6. The computer-implemented method of claim 2, wherein:
closing, by the one or more computers, the current iteration includes automatically updating, by the one or more computers, one or more attributes of the one or more complete constituent work items to indicate that no work remains to be done.

7. A system for managing work items associated with agile software development, comprising:

memory;
a display;
one or more processors; and
one or more programs stored in the memory and configured for execution by the one or more processors, the one or more programs including instructions to:
display a first group of incomplete work items associated with a current iteration of agile software development;
transfer, in response to a first user input, a first incomplete work item of the first group from the current iteration to a subsequent iteration of agile software development;
determine that no incomplete work items remain associated with the current iteration;
close the current iteration; and
activate the subsequent iteration.

8. The system of claim 7, wherein the first group of incomplete work items includes features and defects associated with the current iteration.

9. The system of claim 7, wherein the one or more programs further comprise instructions to:
display an indicator corresponding to the subsequent iteration;
wherein the first user input comprises dragging and dropping the first incomplete work item from the first group onto the indicator corresponding to the subsequent iteration.

10. The system of claim 7, wherein the one or more programs further comprise instructions to:
in response to the first user input, cease display of the first incomplete work item in the first group.

11. The system of claim 7, wherein the one or more programs further comprise instructions to:
in response to determining that no incomplete work items remain associated with the current iteration, display a close iteration icon; and
detect user selection of the close iteration icon;
wherein the current iteration is closed and the subsequent iteration is activated in response to user selection of the close iteration icon.

12. The system of claim 11, wherein the one or more programs further comprise instructions to:
in response to user selection of the close iteration icon:
cease display of work items associated with the current iteration; and
display work items associated with the subsequent iteration.

13. The system of claim 7, wherein the one or more programs further comprise instructions to: prior to determining that no incomplete work items remain associated with the current iteration,
in response to a second user input:
divide a second incomplete work item into a new work item and an original work item, the new work item comprising one or more incomplete constituent work items, wherein the second incomplete work item comprises a plurality of constituent work items, including the one or more incomplete constituent work items and one or more complete constituent work items, the second incomplete work item is a feature or defect associated with the current iteration, and the plurality of constituent work items comprises a task or a test associated with the feature or defect; and
associate the new work item with the subsequent iteration, wherein the original work item is associated with the current iteration.

14. A non-transitory computer readable storage medium storing one or more programs configured to be executed by a computer system to manage work items associated with agile software development, the one or more programs comprising instructions to:
  display a first group of incomplete work items associated with a current iteration of an agile software development project;
  transfer, in response to a first user input, a first incomplete work item of the first group from the current iteration to a subsequent iteration of agile software development;
  determine that no incomplete work items remain associated with the current iteration;
  close the current iteration; and
  activate the subsequent iteration.

15. The computer readable storage medium of claim 14, wherein the one or more programs further comprise instructions to, prior to determining that no incomplete work items remain associated with the current iteration:
  in response to a second user input, close a second incomplete work item of the first group and removing the second work item from the first group.

16. The computer readable storage medium of claim 15, wherein the one or more programs further comprise instructions to:
  in response to the second user input, cease display of the second incomplete work item in the first group.

17. The computer readable storage medium of claim 15, wherein:
  the second incomplete work item is a defect associated with the second iteration; and
  closing the second incomplete work item comprises updating a status of the defect to indicate that the defect has been resolved.

18. The computer readable storage medium of claim 15, wherein:
  the second incomplete work item is a feature associated with the second iteration; and
  closing the second incomplete work item comprises updating a status of the feature to indicate that the feature has been implemented.

19. The computer readable storage medium of claim 15, wherein the one or more programs further comprise instructions to:
  while displaying the first group, simultaneously display a second group of complete work items associated with the current iteration; and
  in response to the second user input, cease display of the second work item in the first group and displaying the second work item in the second group.

20. The computer readable storage medium of claim 14, wherein the one or more programs further comprise instructions to: prior to determining that no incomplete work items remain associated with the current iteration,
  in response to a second user input:
    divide a second incomplete work item into a new work item and an original work item, the new work item comprising one or more incomplete constituent work items, wherein the second incomplete work item comprises a plurality of constituent work items, including the one or more incomplete constituent work items and one or more complete constituent work items, the second incomplete work item is a feature or defect associated with the current iteration, and the plurality of constituent work items comprises a task or a test associated with the feature or defect; and
  associate the new work item with the subsequent iteration, wherein the original work item is associated with the current iteration.

* * * * *